United States Patent
Kim et al.

(10) Patent No.: US 10,986,512 B2
(45) Date of Patent: *Apr. 20, 2021

(54) METHOD AND APPARATUS FOR ASSOCIATING BETWEEN A STATION AND AN ACCESS POINT IN A WIRELESS COMMUNICATION SYSTEM

(71) Applicant: LG ELECTRONICS INC., Seoul (KR)

(72) Inventors: Sanggook Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,688

(22) Filed: Mar. 2, 2020

(65) Prior Publication Data
US 2020/0205014 A1 Jun. 25, 2020

Related U.S. Application Data

(63) Continuation of application No. 16/316,029, filed as application No. PCT/KR2017/007335 on Jul. 7, 2017, now Pat. No. 10,616,775.
(Continued)

(51) Int. Cl.
*H04W 16/28* (2009.01)
*H04B 7/06* (2006.01)
(Continued)

(52) U.S. Cl.
CPC ............ *H04W 16/28* (2013.01); *H04B 7/063* (2013.01); *H04B 7/0695* (2013.01);
(Continued)

(58) Field of Classification Search
CPC ... H04W 16/28; H04W 74/006; H04W 84/12; H04W 48/12; H04B 7/0695; H04B 7/063
See application file for complete search history.

(56) References Cited

U.S. PATENT DOCUMENTS

| | | | |
|---|---|---|---|
| 10,616,775 B2 * | 4/2020 | Kim | H04W 16/28 |
| 2010/0103045 A1 | 4/2010 | Liu et al. | |

(Continued)

FOREIGN PATENT DOCUMENTS

| | | |
|---|---|---|
| WO | 2010053738 | 5/2010 |
| WO | 2017048091 | 3/2017 |

OTHER PUBLICATIONS

PCT International Application No. PCT/KR2017/007335, International Search Report dated Oct. 25, 2017, 3 pages.
(Continued)

*Primary Examiner* — Omar J Ghowrwal
(74) *Attorney, Agent, or Firm* — Lee, Hong, Degerman, Kang & Waimey

(57) ABSTRACT

The present invention provides a method for performing association beamforming training (A-BFT) between an enhanced STA device and a PCP/AP (Personal basic service set Control Point/Access Point) in a wireless communication system. Specifically, the method performed by the enhanced STA device comprises receiving, from the PCP/AP, a beacon frame during a beacon interval, wherein the beacon frame includes information element (IE) used for an enhanced directional multi-gigabit (EDMG) operation; and performing the A-BFT with the PCP/AP based on the received IE, wherein the IE includes control information related to an access attempt of the A-BFT.

17 Claims, 23 Drawing Sheets

Related U.S. Application Data

(60) Provisional application No. 62/359,687, filed on Jul. 7, 2016, provisional application No. 62/360,926, filed on Jul. 11, 2016.

(51) Int. Cl.
*H04W 74/00* (2009.01)
*H04W 48/12* (2009.01)
*H04W 84/12* (2009.01)

(52) U.S. Cl.
CPC .......... *H04W 74/006* (2013.01); *H04W 48/12* (2013.01); *H04W 84/12* (2013.01)

(56) References Cited

U.S. PATENT DOCUMENTS

| | | |
|---|---|---|
| 2012/0163264 A1 | 6/2012 | Chu et al. |
| 2013/0329712 A1 | 12/2013 | Cordeiro et al. |
| 2016/0094957 A1 | 3/2016 | Levy et al. |
| 2016/0191132 A1 | 6/2016 | Rajagopal et al. |
| 2016/0330684 A1 | 11/2016 | Sinha et al. |
| 2017/0006631 A1 | 1/2017 | Tian et al. |
| 2017/0207837 A1* | 7/2017 | Kim ...................... H01Q 3/005 |
| 2018/0254810 A1 | 9/2018 | Kim et al. |
| 2019/0349782 A1 | 11/2019 | Kim et al. |

OTHER PUBLICATIONS

Intel Corporation, "Some LB199 Proposed Resolutions," doc.: IEEE 802.11-13/1314r15, Mar. 2014, 86 pages.

U.S. Appl. No. 16/316,029, Notice of Allowance dated Nov. 27, 2019, 33 pages.

Wong, D. et al., "Directional Medium Access Control (MAC) Protocols in Wireless Ad Hoc and Sensor Networks: A Survey," Journal of Sensor and Actuator Networks, pp. 67-153, Jun. 2015, 87 pages.

European Patent Office Application Serial No. 17824600.5, Office Action dated Sep. 7, 2020, 6 pages.

\* cited by examiner

【FIG. 1】
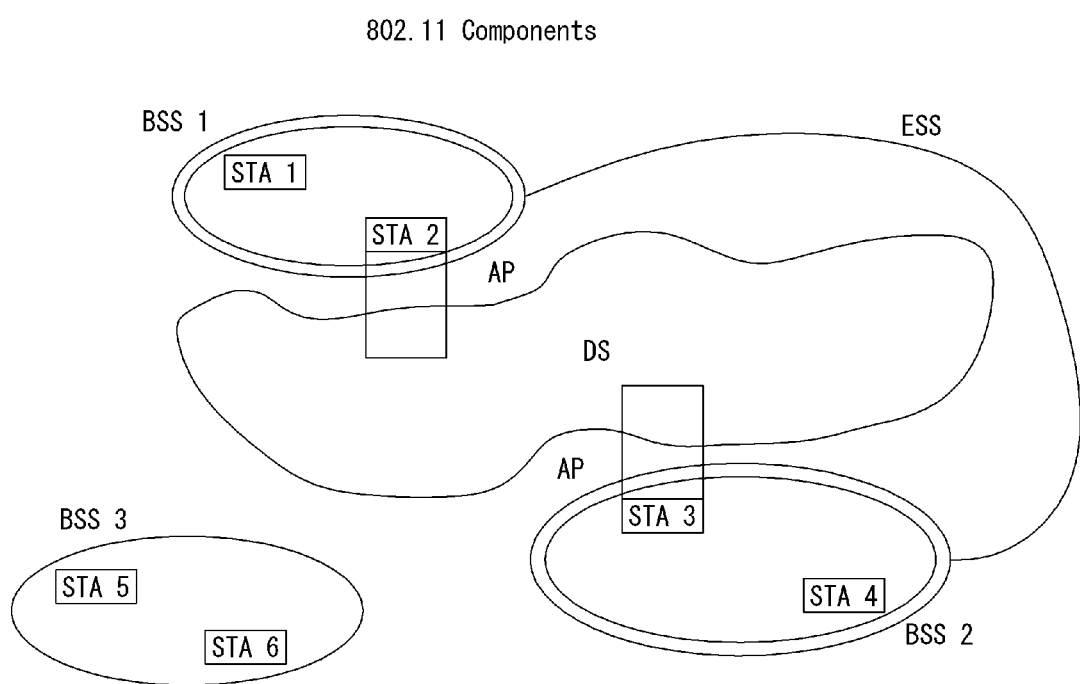

[FIG. 2]
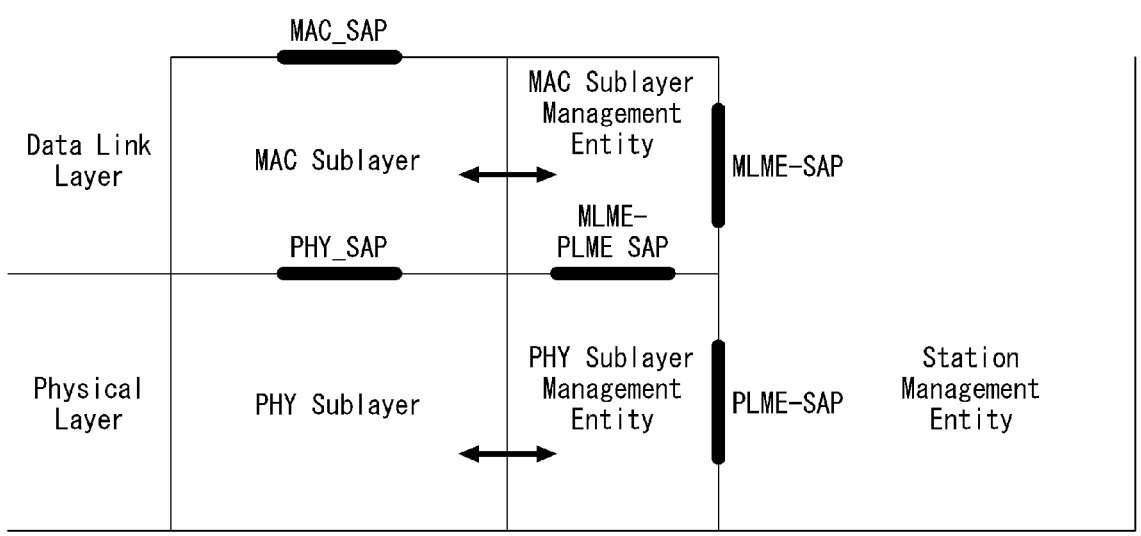

【FIG. 3】
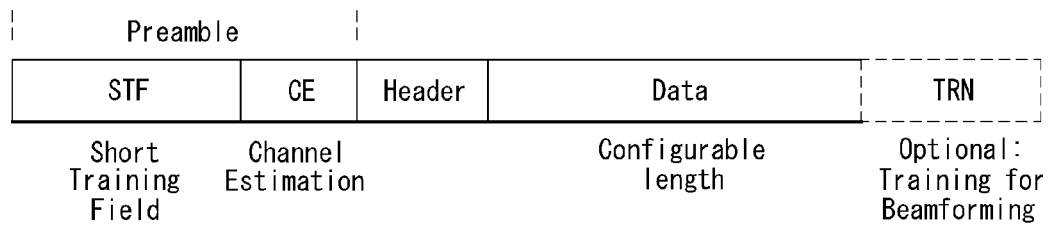
【FIG. 4】
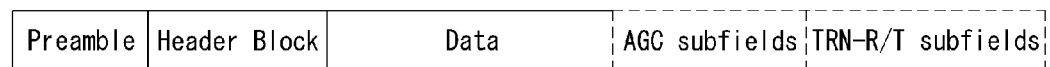

【FIG. 5】
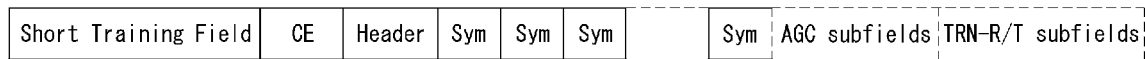

[FIG. 6]

| Short Training Field | CE | Header | BLK | BLK | BLK | | BLK | AGC subfields | TRN-R/T subfields |

【FIG. 7】

| FC | Duration/ID | Address 1 | Address 2 | Address 3 | Sequence Control | Address 4 | QoS Control | DATA | FCS |

【FIG. 8】
| | B0 B1 | B2 B3 | B4 B7 | B8 | B9 | B10 | B11 | B12 | B13 | B14 | B15 |
|---|---|---|---|---|---|---|---|---|---|---|---|
| (a) | Protocol Version | Type | Subtype | To DS | From DS | More Fragmnts | Retry | Power Management | More Data | Pretected Frame | Order |
| Bits: | 2 | 2 | 4 | 1 | 1 | 1 | 1 | 1 | 1 | 1 | 1 |
| | B0 B1 | B2 B3 | B4 B7 | B8 B11 | B12 | B13 | B14 | B15 |
|---|---|---|---|---|---|---|---|---|
| (b) | Protocol Version | Type | Subtype | Control Frame Extension | Power Management | More Data | Pretected Frame | Order |
| Bits: | 2 | 2 | 4 | 4 | 1 | 1 | 1 | 1 |
【FIG. 9】
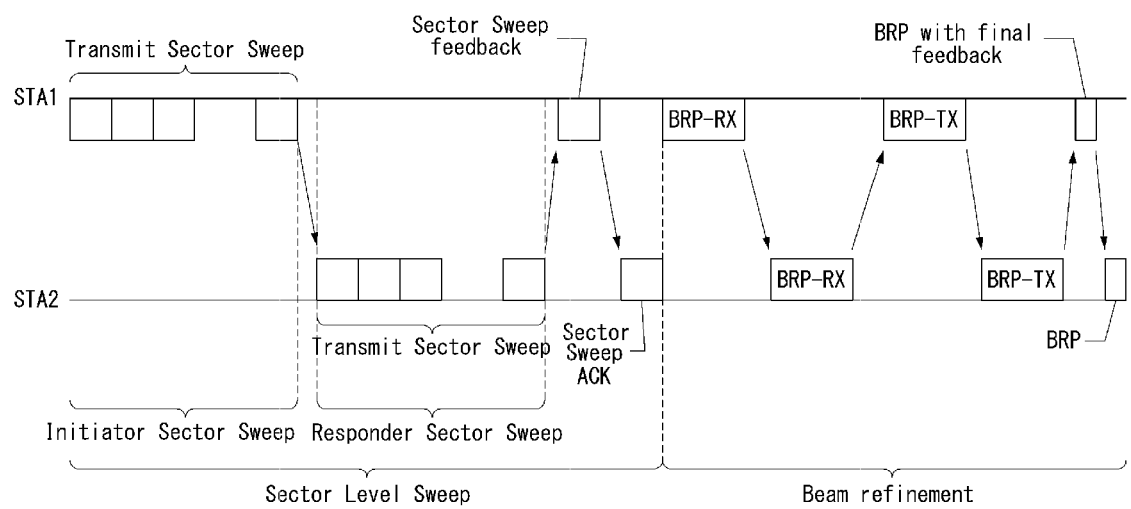

[FIG. 10]
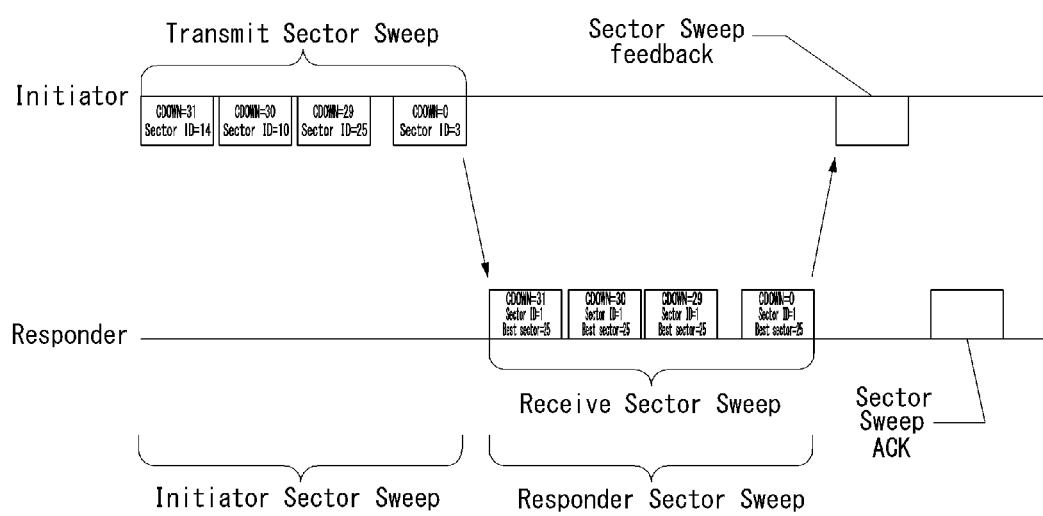

【FIG. 11】
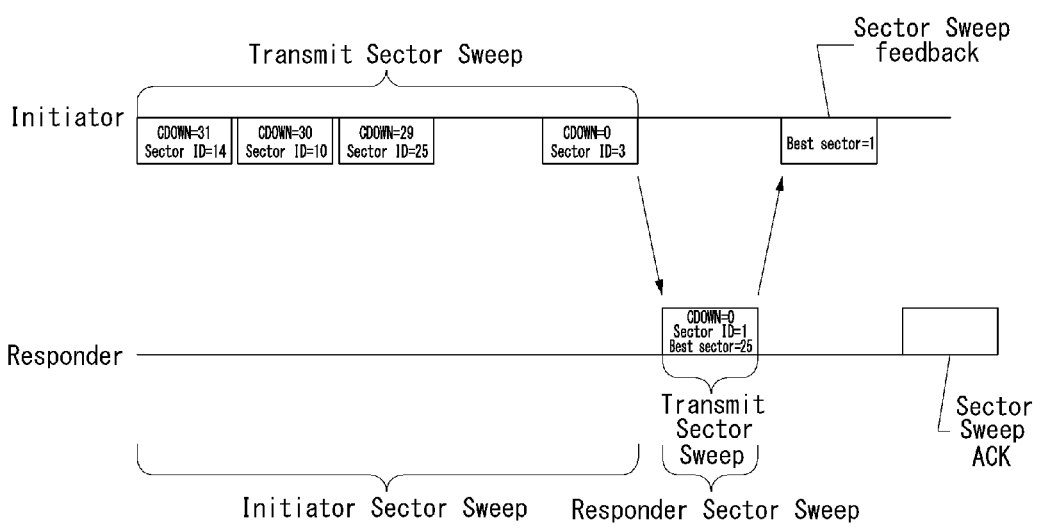

【FIG. 12】
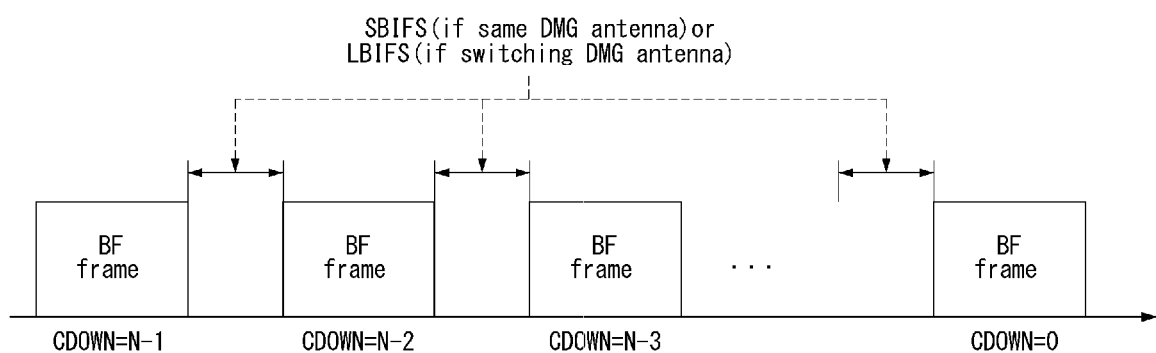

[FIG. 13]
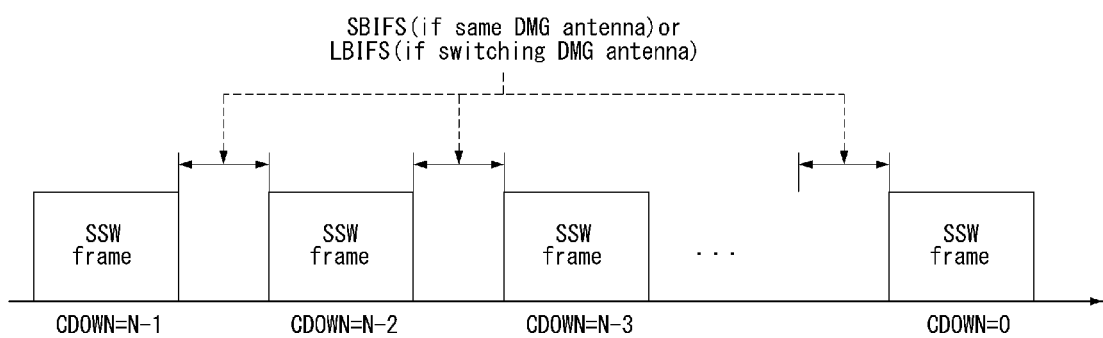

【FIG. 14】
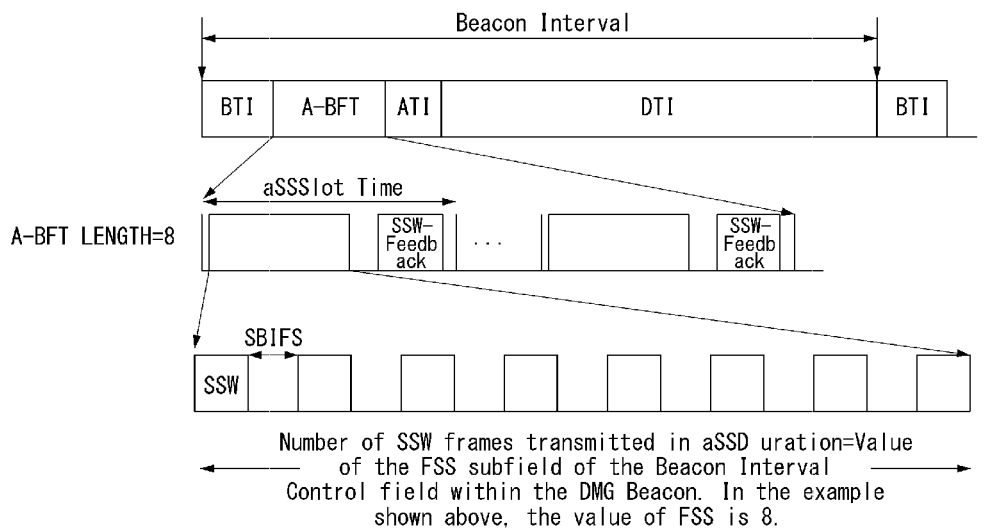
Example of A-BFT with elngth 8 and with each SSW slot accommodating 8 SSW frames. A possible contention between 3 STAs is shown in the figure below:STAs A,B and C are competing for access. All STAs choose a random value between [0,7].STA A chooses value=2, while STAs B and C choose value=5,which might result in a collision.

[FIG. 15]
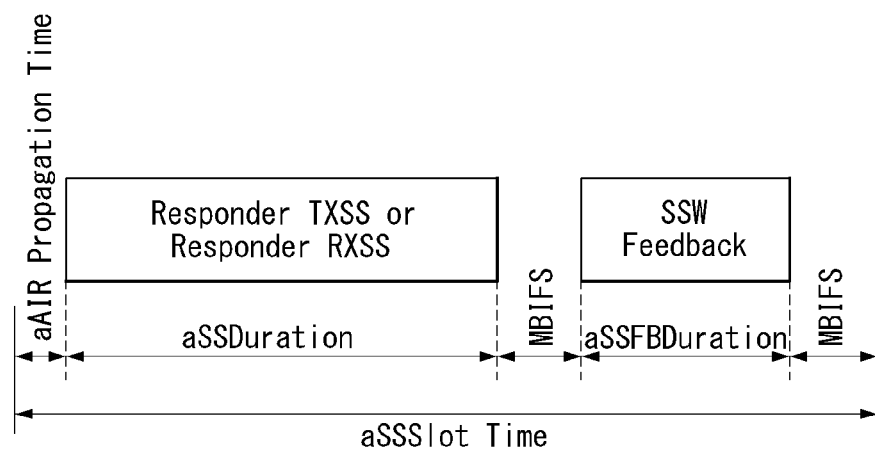

【FIG. 16】
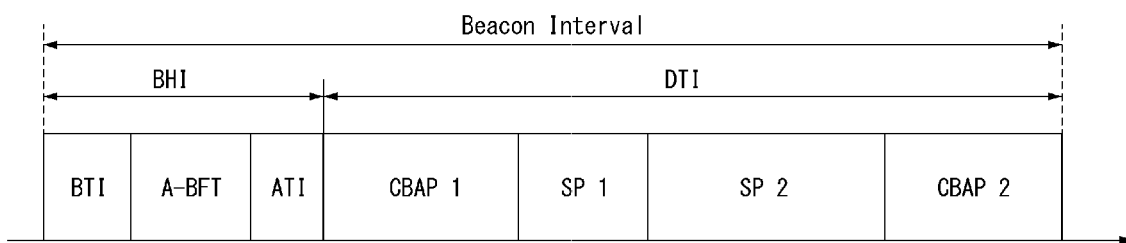

[FIG. 17]

| | B0 | B1 | B2  B5 | B6 | B7  B9 | B10 B13 | B14 |
|---|---|---|---|---|---|---|---|
| | CC Present | Discovery Mode | Next Beacon | ATI Present | A-BFT Length | FSS | IsResponderTXSS |
| Bits: | 1 | 1 | 4 | 1 | 3 | 4 | 1 |

| | B15 B18 | B19 | B20 B26 | B27 B30 | B31 B36 | B37 B42 | B43 | B44 B47 |
|---|---|---|---|---|---|---|---|---|
| | Next A-BFT | Fragmerted TXSS | TXSS Span | N BIs A-BFT | A-BFT Count | N A-BFT in Ant | PCP Association Ready | Reserved |
| Bits: | 4 | 1 | 7 | 4 | 6 | 6 | 1 | 4 |

[FIG. 18]

```
dot11RSSRetryLimit OBJECT-TYPE
    SYNTAX Unsigned32 (1..32)
    MAX-ACCESS read=write
    STATUS current
    DESCRIPTION
        "This is a control variable.
        It is written by the SME or an extrnal management entity.
        Changes take effect as soon as practical in the implementation.

Responder Sector Sweep Retry Limit"
DEFVAL {8}
::= { dot11DMGBeamformingConfigEntry 5 } dot11RSSBackoff OBJECT-TYPE
    SYNTAX Unsigned32 (1..32)
    MAX-ACCESS read-write
    STATUS current
    DESCRIPTION
        "This is a control variable.
        It is written by the SME or an external managemnt entity.
        Changes take effect as soon as practical in the implementation.

Responder Sector Sweep Backoff"
    DEFVAL {8}
        ::= { dot11DMGBeamformingConfigEntry 6}
```

[FIG. 19]

| Order | Information | Notes |
|---|---|---|
| 1 | Timestamp | See 8.4.1.10 |
| 2 | Sector Sweep | See 8.4a.1 |
| 3 | Beacon Interval | See 8.4.1.3 |
| 4 | Beacon Interval Control | See Figure 8-34b. |
| 5 | DMG Parameters | See 8.4.1.46 |
| 6 | Clustering Control | Optional. See Figure 8-34c and Figure 8-34d. |
| 7 | DMG Capabilities | The DMG Capabilities element is optionall present. |
| 8 | Extended Schedule | The Extended Schedul element is optionall present. |
| 9 | RSN | The RSNE is optionally present if dot11RSNA Enabled is true. |
| 10 | Multiple BSSID | One or more Multiple BSSID elements are optionally present if dot11Mgmt Option Multi BSSID Enabled is true. |
| 11 | DMG Operation | The DMG Operation element is optionally present. |
| 12 | Next DMG ATI | The Next DMG ATI element is optionally present. |
| 13 | DMG BSS Parameter Change | The DMG BSS Parameter Change element is optionally present. |
| 14 | Multi-band | The Multi-band element is optionally present if dot11Multiband Implemented is true. |
| Last-n | One or more elements can appear in this frame. These elements follow all other elements that are not vendor-specific elements and precede all other elements that are vendor-dpecific elements that are part of the Last field in the frame. Except for the Multi-band element, an element can be included only once in the frame. | Optional |
| Last | Vendor Specific | One or more vendor-specific elements are optionally present. These elements follow all other elements. |

[FIG. 20]
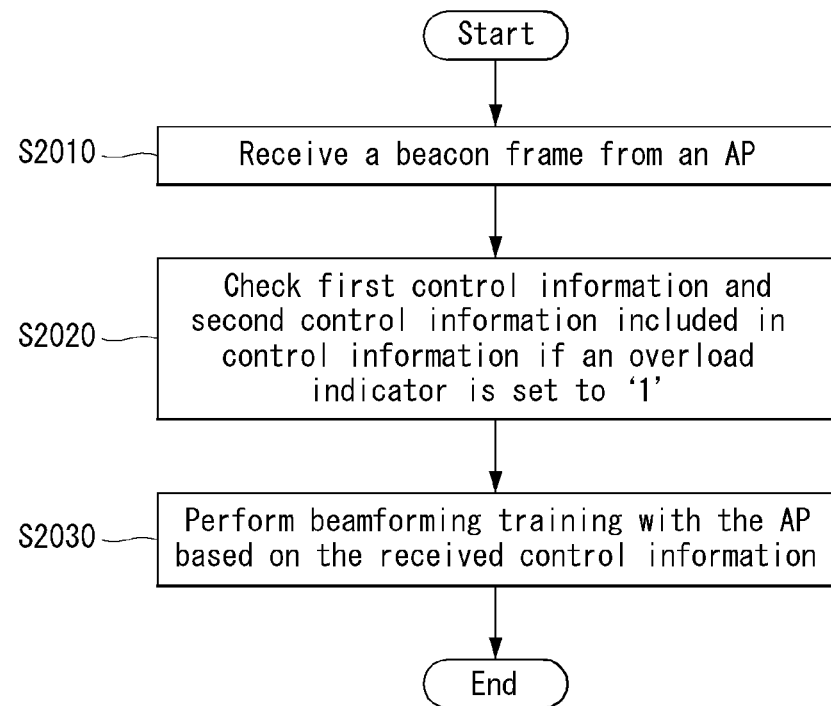

[FIG. 21]
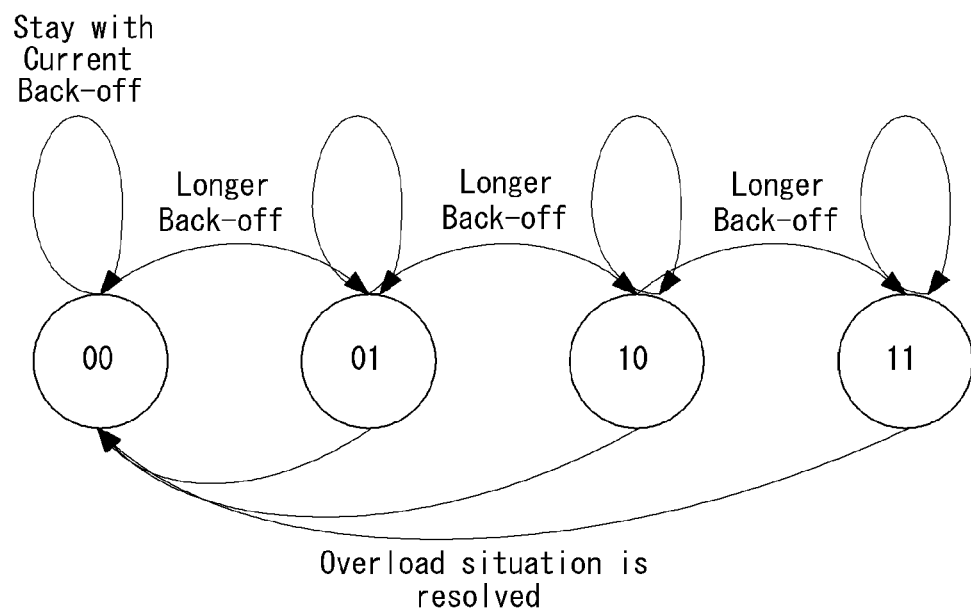

[FIG. 22]
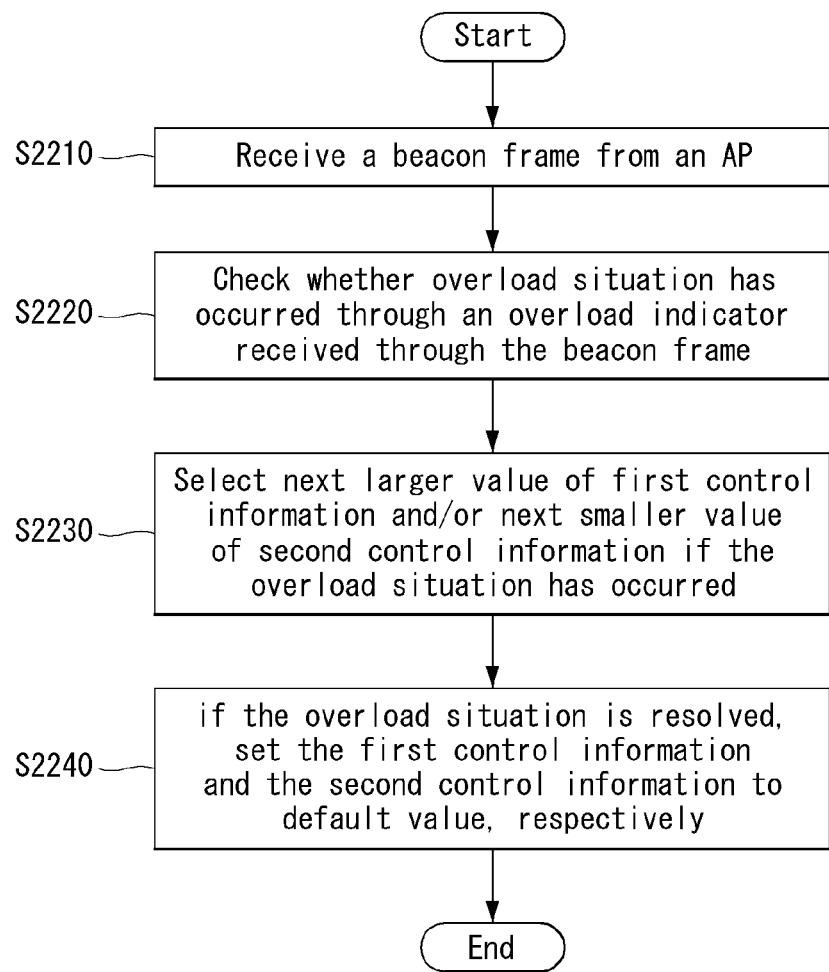

[FIG. 23]
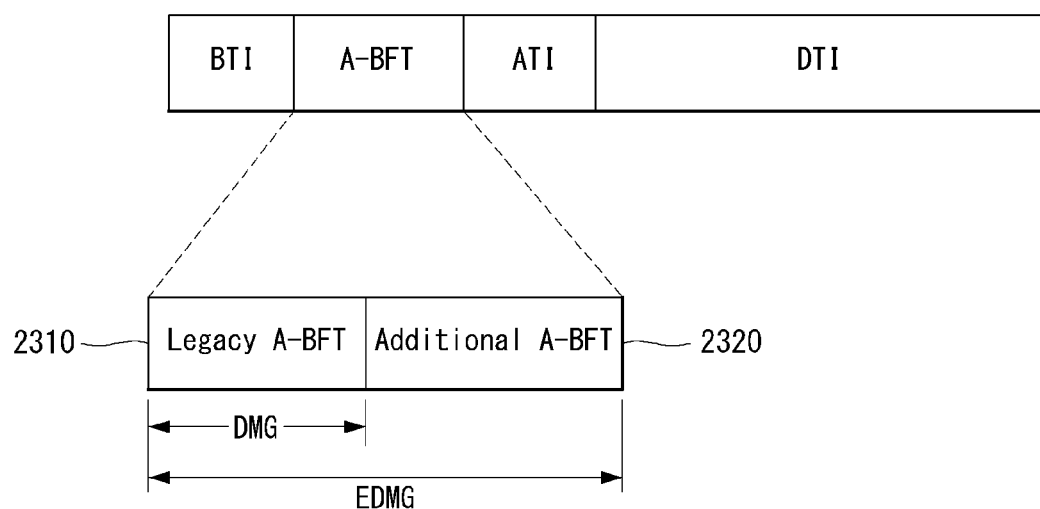

[FIG. 24]
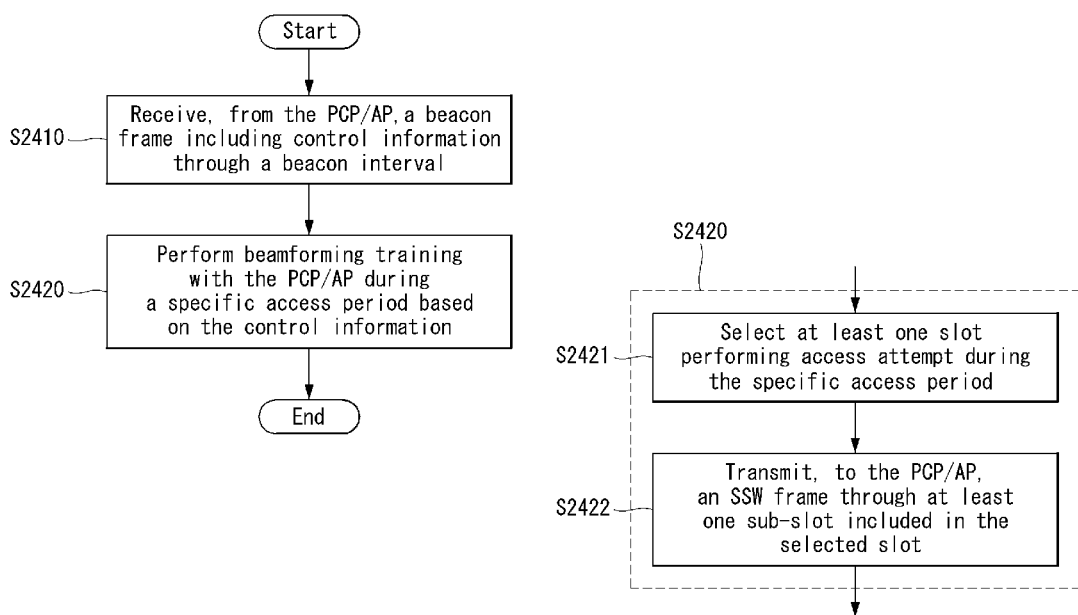

[FIG. 25]
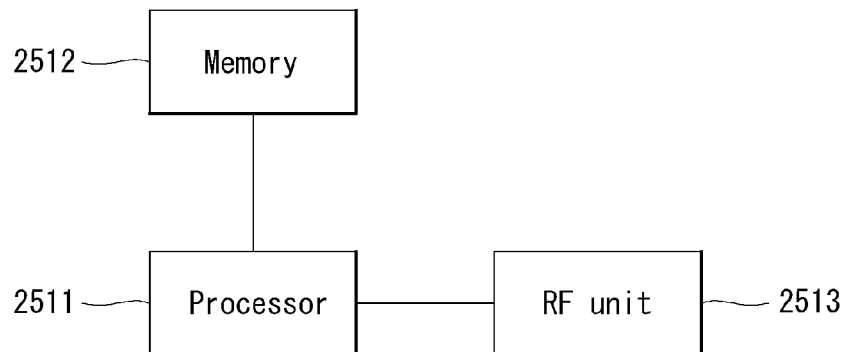

METHOD AND APPARATUS FOR ASSOCIATING BETWEEN A STATION AND AN ACCESS POINT IN A WIRELESS COMMUNICATION SYSTEM

CROSS-REFERENCE TO RELATED APPLICATIONS

This application is a continuation of U.S. patent application Ser. No. 16/316,029, filed on Jan. 7, 2019, now U.S. Pat. No. 10,616,775, which is the National Stage filing under 35 U.S.C. 371 of International Application No. PCT/KR2017/007335, filed on Jul. 7, 2017, which claims the benefit of U.S. Provisional Application No. 62/359,687, filed on Jul. 7, 2016, and 62/360,926, filed on Jul. 11, 2016, the contents of which are all hereby incorporated by reference herein in their entirety.

TECHNICAL FIELD

The present invention relates to a wireless communication system and, more particularly, to a method for associating between a station and an access point and an apparatus for supporting the same.

BACKGROUND ART

WI-FI is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and mainly operates in a 5 GHz band.

Recently, a need for a new WLAN system for supporting a higher throughput than a data rate supported by IEEE 802.11 ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

On the other hand, IEEE 802.11ad defines performance enhancement for ultra high throughput in the 60 GHz band.

In IEEE 802.11, TGad (Task Group ad) was devoted to develop the standard that uses the unlicensed mmWave spectrum (57-64 GHz) and its revision is being under development.

Advanced antenna technology was introduced to handle a single stream transmission. It showed that maximum data rate around 6.9 Gbps over 2.16 GHz channel bandwidth can be achieved.

In addition, IEEE 802.11ad introduced a new network architecture termed as personal basic service set (PBSS). It combines the distributed nature of connections among the stations with central coordination point known as PBSS control point (PCP). The station that roles as a PCP and has access point capability is termed as PCP/AP.

Also, there is a discussion on IEEE 802.11ay for introducing channel bonding and MIMO technology to IEEE 802.11ad systems.

That is, new task group termed as TGay (task group ay) considers the enhancements on IEEE 802.11ad by considering antenna technology to transmit and receive multiple streams, channel aggregation (aggregation of more than one 2.16 GHz channel bandwidth), multiple accesses over multiple channels, and so on. Its main target operation environments include dense and urban environments.

DISCLOSURE

Technical Problem

The present invention provides a method for controlling overload situations due to limited resources in mmWave communications.

The present invention provides a method for defining control information related to an access attempt of beamforming training.

The objects of the present invention are not limited to the technical objects described above, and other technical objects not mentioned herein may be understood to those skilled in the art from the description below.

Technical Solution

In an aspect of the present invention, a method for associating between an enhanced STA (station) device and a PCP/AP (Personal basic service set (PBSS) Control Point/ Access Point) in a wireless communication system, the method performed by the enhanced STA device, comprising: receiving, from the PCP/AP, a beacon frame through a beacon interval, wherein the beacon frame comprises control information related to an access attempt of beamforming training; and performing the beamforming training with the PCP/AP during a specific access period based on the received control information, wherein the performing comprising: selecting at least one slot, performing the access attempt during the specific access period; and transmitting, to the PCP/AP, an SSW (sector sweep) frame through at least one sub-slot included in the selected slot.

In another aspect of the present invention, an enhanced STA device for associating with a PCP/AP in a wireless communication system, comprising: a radio frequency (RF) unit for transceiving a radio signal; and a processor functionally connected to the RF unit, wherein the processor is configured to perform: receiving, from the PCP/AP, a beacon frame through a beacon interval, wherein the beacon frame comprises control information related to an access attempt of beamforming training; and performing the beamforming training with the PCP/AP during a specific access period based on the received control information, wherein the performing comprising: selecting at least one slot, performing the access attempt during the specific access period; and transmitting, to the PCP/AP, an SSW frame through at least one sub-slot included in the selected slot.

Preferably, the control information comprises at least one of a first control information or a second control information, and wherein the first control information indicates a value of retry limit that the enhanced STA device attempting to access an association beamforming training (A-BFT) uses, and the second control information indicates a back-off value that the enhanced STA device uses when the consecutive number of failed attempts to access the A-BFT exceeds the retry limit indicated by the first control information.

Preferably, the performing further comprising: performing the access attempt with the PCP/AP based on the first control information; and if the access attempt is not successful, back-offing the access attempt for certain duration of the time that is determined by the second control information.

Preferably, the specific access period is an A-BFT (Association-Beamforming Training).

Preferably, the enhanced STA device is an EDMG (Enhanced Directional Multi-Gigabit) STA device.

Preferably, the control information is included in an extended schedule field of a beacon frame body, the beacon frame body included in the beacon frame.

Preferably, the beacon frame comprises an overload indicator that indicates whether an overload situation occurs.

Preferably, the overload indicator is included in a beacon interval control field of the beacon frame body.

Preferably, if the overload indicator indicates that the overload situation has occurred, the control information is included in the extended schedule field.

Preferably, the control information comprises a first set of bits and a second set of bits, and wherein the first set of bits indicates the number of consecutive access attempt(s) until a successful association of the beamforming training is achieved, and the second set of bits indicates a back-off value of the access attempt if the association is not successful.

Preferably, the beacon frame comprises an overload indicator indicates that the overload situation occurs, and wherein the first control information is set to the next larger value of previous first control information, and the second control information is set to the next smaller value of previous second control information.

Preferably, the performing the beamforming training is performed if the overload indicator is transmitted a predetermined number.

Preferably, the back-off value also increases with increase in the value of the control information.

Preferably, the first control information and the second control information are to set a default value if the overload situation is resolved.

Preferably, the specific access period comprises a first access period and a second access period, and wherein the first access period is related to an access attempt of a legacy STA device, and the second access period is related to an access attempt of the enhanced STA device.

Preferably, the method further comprising: receiving information indicating the number of slot included in the second access period.

Preferably, the method further comprising: selecting a first slot in the first access period and a second slot in the second access period.

Preferably, the first slot and the second slot have a different slot frame structure.

Preferably, if multiple channels are used in the access attempt, the first control information and the second control information have same or different values per each channel.

Advantageous Effects

The present invention defines new parameters related to beamforming training and can solve the overload situations that may occur in mmWave communication.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is a diagram illustrating an example of IEEE 802.11 system to which the present invention may be applied.

FIG. 2 is a diagram exemplifying a structure of layer architecture in IEEE 802.11 system to which the present invention may be applied.

FIG. 3 is a diagram showing an example of a physical configuration of a radio frame to which the present invention can be applied.

FIG. 4 shows an example of the Control PHY frame format.

FIG. 5 shows an example of an OFDM PHY frame format.

FIG. 6 shows an example of the SC PHY frame format.

FIG. 7 shows an example of a MAC frame format.

FIG. 8 shows an example of a frame control field.

FIG. 9 gives an example of the beamforming training procedure.

FIG. 10 and FIG. 11 illustrate examples of SLS.

FIG. 12 illustrates an example of Initiator TXSS or Initiator RXSS.

FIG. 13 illustrates an example of Responder TXSS or Responder RXSS.

FIG. 14 illustrates an example of an A-BFT structure to which the present invention may be applied.

FIG. 15 illustrates an SSW slot (aSSSlotTime) definition to which the present invention may be applied.

FIG. 16 illustrates an example of access periods within a beacon interval to which the present invention may be applied.

FIG. 17 illustrates an example of beacon interval control field to which the present invention may be applied.

FIG. 18 illustrates an example of a dot11RSSRetryLimit and a dot11RSSBackoff defined for A-BFT operation for 11 ad STAs.

FIG. 19 illustrates an example of a DMG beacon frame body according to an embodiment of the present invention.

FIG. 20 is a flowchart showing an example of a method for solving the overload situation proposed in the present specification.

FIG. 21 illustrates an example operation of dynamic back-off control according to an embodiment of the present invention.

FIG. 22 is a flowchart showing another example of a method for solving the overload situation proposed in the present specification.

FIG. 23 illustrates example of access periods with additional A-BFT according to an embodiment of the present invention.

FIG. 24 is a flowchart illustrating an example of a method for performing beamforming training between an STA and an AP proposed in the present specification.

FIG. 25 is a block diagram exemplifying a wireless apparatus according to an embodiment of the present invention.

BEST MODES

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide thorough understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Specific terminologies used in the description below may be provided to help the understanding of the present invention. And, the specific terminology may be modified into other forms within the scope of the technical concept of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (WI-FI), IEEE 802.16 (WIMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, 5G New Radio (NR), and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 is chiefly described, but the technical characteristics of the present invention are not limited thereto.

For the purposes of the present invention, the following abbreviations apply.

A-BFT: association beamforming training
ATI: announcement transmission interval
AWV: antenna weight vector
BC: beam combining
BF: beamforming
BHI: beacon header interval
BRP: beam refinement protocol
BRPIFS: beam refinement protocol interframe space
BTI: beacon transmission interval
CBAP: contention-based access period
CCSR: centralized coordination service root
CCSS: centralized coordination service set
DMG: directional multi-gigabit
DTI: data transfer interval
ECPAC: extended centralized PCP/AP cluster
HT: High Throughput
GF: Green Field
GP: grant period
ID: Identification or Identifier
ISS: initiator sector sweep
LBIFS: long beamforming interframe space
LP: low power
MBIFS: medium beamforming interframe space
MID: multiple sector identifier
MIDC: multiple sector identifier capture
MM-SME: multiple MAC station management entity
MMS: multiple MAC sublayers MMSL: multiple MAC sublayers link
PBSS: personal basic service set
PCP: PBSS control point
PCPS: PBSS control point service
PLOP: Physical Layer Convergence Procedure
PPDU: PLOP Protocol data unit
QoS: Quality of Service
RSS: responder sector sweep
RDS: relay DMG STA
REDS: relay endpoint DMG STA
RXSS: receive sector sweep
S-AP: synchronization access point
SBIFS: short beamforming interframe space
SC: single carrier
SIG: signal field
SLS: sector-level sweep
SPCA: service period channel access
S-PCP: synchronization PBSS control point
SPR: service period request
SSW: sector sweep
TDDTI: time division data transfer interval
TPA: transmission time-point adjustment
TRN-R: receive training
TRN-T: transmit training
TXSS: transmit sector sweep
VHT: Very High Throughput For the purposes of the present invention, the following terms and definitions apply.

Directional Multi-Gigabit (DMG): Pertaining to operation in a frequency band containing a channel with the Channel starting frequency above 45 GHz.

Target beacon transmission time (TBTT) of a beacon interval of a directional multi-gigabit (DMG) basic service set (BSS) and that ends no later than the beginning of the data transfer interval (DTI) of the beacon interval.

Beacon transmission interval (BTI): The time interval between the start of the first Directional Multi-gigabit (DMG) Beacon frame transmission by a DMG station (STA) in a beacon interval to the end of the last DMG Beacon frame transmission by the DMG STA in the same beacon interval.

centralized coordination service root (CCSR): An entity that provides synchronization and configuration services to synchronization access points (S-APs).

centralized coordination service set (CCSS): The collection of one centralized coordination service root (CCSR) and a set of one or more synchronization access points (S-APs) that are stationary with respect to their local environment while operating and are connected to the CCSR.

destination directional multi-gigabit (DMG) station (STA): A DMG STA identified by the destination association identifier (AID) field contained in a Grant frame or Extended Schedule element that caused the allocation of a service period (SP) or a contention-based access period (CBAP).

directional multi-gigabit (DMG) access point (AP): An AP whose radio transmitter is capable of transmitting and receiving DMG physical layer convergence procedure (PLOP) protocol data units (PPDUs).

directional multi-gigabit (DMG) antenna: A DMG antenna is a phased array, a single element antenna, or a set of switched beam antennas covered by a quasi-omni antenna pattern.

directional multi-gigabit (DMG) basic service set (BSS): A BSS in which DMG Beacon frames are transmitted by DMG stations (STAs).

directional multi-gigabit (DMG) frame: A frame transmitted or received within a DMG physical layer convergence procedure (PLOP) protocol data unit (PPDU).

directional multi-gigabit (DMG) physical layer convergence procedure (PLOP) protocol data unit (PPDU): A Clause 21 PPDU transmitted or received using the Clause 21 physical layer (PHY).

directional multi-gigabit (DMG) station (STA): A STA whose radio transmitter is capable of transmitting and receiving DMG physical layer convergence procedure (PLOP) protocol data units (PPDUs).

directional transmission: A transmission that does not use an omnidirectional antenna pattern or quasiomni antenna pattern.

downlink: A unidirectional link from an access point (AP) to one or more non-AP stations (STAs) or a unidirectional link from a non-AP destination directional multi-gigabit (DMG) STA to a non-AP source DMG STA.

extended centralized personal basic service set (PBSS) control point (PCP)/access point (AP) cluster (ECPAC): The collection of 1) a single centralized coordination service set (CCSS), 2) the set of centralized PCP/AP clusters such that each synchronization AP (S-AP) of a centralized PCP/AP cluster is within the CCSS, and 3) all stations (STAs) within the basic service sets (BSSs) of the S-APs and member PCPs/APs of the centralized PCP/AP clusters.

multiple medium access control (MAC) sublayers link (MMSL): A link between two stations (STAs), wherein one of the STAs is coordinated by a multiple MAC station management entity (MM-SME) that delivered a Multiple MAC Sublayers (MMS) element to the peer STA.

multiple medium access control (MAC) sublayers link cluster: All multiple MAC sublayers links between a pair of stations (STAs).

personal basic service set (PBSS) control point (PCP)/access point (AP) cluster: One directional multigigabit (DMG) synchronization PCP or DMG synchronization AP, plus zero or more neighboring DMG PCPs, DMG APs (or a mixture of both) that join as member PCPs/APs to the synchronization PCP or synchronization AP.

quasi-omni antenna pattern: A directional multi-gigabit (DMG) antenna operating mode with the widest beamwidth attainable.

receive sector sweep (RXSS): Reception of Sector Sweep (SSW) frames via different sectors, in which a sweep is performed between consecutive receptions.

source directional multi-gigabit (DMG) station (STA): A DMG STA identified by the source association identifier (AID) field contained in a Grant frame or Extended Schedule element that caused the allocation of a service period (SP) or contention-based access period (CBAP).

sweep: A sequence of transmissions, separated by a short beamforming interframe space (SBIFS) interval, in which the antenna configuration at the transmitter or receiver is changed between transmissions.

synchronization access point (AP) (S-AP): An AP that provides synchronization and other services to a personal basic service set (PBSS) control point (PCP)/AP Cluster.

synchronization personal basic service set (PBSS) control point (PCP) (S-PCP): A PCP that provides synchronization and other services to a PCP/access point (AP) Cluster.

synchronization personal basic service set (PBSS) control point (PCP) (S-PCP)/synchronization access point (AP) (S-AP): A station (STA) that is at least one of an S-PCP or an S-AP.

transmit sector sweep (TXSS): Transmission of multiple Sector Sweep (SSW) or Directional Multi-gigabit (DMG)

Beacon frames via different sectors, in which a sweep is performed between consecutive transmissions.

transmit sector sweep contention-based access period (TXSS CBAP): A CBAP that is available to all stations (STAs) in an extended centralized personal basic service set (PBSS) control point (PCP)/access point (AP) cluster outside which TXSSs in the data transfer interval (DTI) can be prohibited.

uplink: A unidirectional link from a non-access point (non-AP) station (STA) to an access point (AP) or a unidirectional link from a non-AP source directional multi-gigabit (DMG) STA to a non-AP destination DMG STA.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs, BSS 1 to BSS 3, are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on, or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a DS. However, the ESS does not include the DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram exemplifying a structure of layer architecture in IEEE 802.11 system to which the present invention may be applied.

Referring to FIG. 2, the layer architecture in the IEEE 802.11 system may include Medium Access Control (MAC) sublayer/layer and PHY sublayer/layer.

The PHY sublayer may be divided into a Physical Layer Convergence Procedure (PLOP) entity and a Physical Medium Dependent (PMD) entity. In this case, the PLOP entity performs a role of connecting the MAC sublayer and a data frame, and the PMD entity performs a role of wirelessly transmitting and receiving data with two or more STAs.

Both of the MAC sublayer and the PHY sublayer may include management entities, and each of them may be referred to MAC Sublayer Management Entity (MLME) and Physical Sublayer Management Entity (PLME), respectively. These management entities provide a layer management service interface through an operation of layer management function. The MLME may be connected to the PLME, and perform a management operation of MAC sublayer, and similarly, the PLME may be connected to the MLME, and perform a management operation of PHY sublayer.

In order to provide an accurate MAC operation, a Station Management Entity (SME) may be existed in each STA. The SME is a management entity independent from each layer, and collects layer-based state information from the MLME and the PLME or configures a specific parameter value of each layer. The SME may perform such a function by substituting general system management entities, and may implement a standard management protocol.

The MLME, the PLME and the SME may interact in various methods based on a primitive. Particularly, XX-GET.request primitive is used for requesting a Management Information Base (MIB) attribute value. XX-GET.confirm primitive returns the corresponding MIB attribute value when the state of it is in 'SUCCESS', otherwise, returns a state field with an error mark. XX-SET.request primitive is used for requesting to configure a designated MIB attribute to a given value. When the MIB attribute signifies a specific operation, the request requests an execution of the specific operation. And, when a state of XX-SET.confirm primitive is in 'SUCCESS', this means that the designated MIB attribute is configured as the requested value. When the MIB attribute signifies a specific operation, the primitive is able to verify that the corresponding operation is performed.

The operation in each sublayer will be briefly described as follows.

MAC sublayer generates one or more MAC Protocol Data Unit (MPDU) by attaching a MAC header and Frame Check Sequence (FCS) to a MAC Service Data Unit (MSDU) delivered from a higher layer (e.g., LLC layer) or a fragment of the MSDU. The generated MPDU is delivered to PHY sublayer.

When an aggregated MSDU (A-MSDU) scheme is used, a plurality of MSDUs may be merged into one A-MSDU. The MSDU merging operation may be performed in a MAC higher layer. The A-MSDU is delivered to PHY sublayer as a single MPDU (i.e., not being fragmented).

PHY sublayer generates a Physical Protocol Data Unit (PPDU) by attaching an additional field that includes required information to a Physical Service Data Unit (PSDU) received from MAC sublayer by a physical layer transceiver. The PPDU is transmitted through a wireless medium.

Since the PSDU is a unit that PHY sublayer receives from MAC sublayer and MPDU is a unit that MAC sublayer transmits to PHY sublayer, the PSDU is the same as the MPDU, substantially.

When an aggregated MPDU (A-MPDU) scheme is used, a plurality of MPDUs (in this case, each MPDU may carry the A-MPDU) may be merged into a single A-MPDU. The MPDU merging operation may be performed in a MAC lower layer. Various types of MPDU (e.g., QoS data, Acknowledge (ACK), block ACK, etc.) may be merged into the A-MPDU. PHY sublayer receives the A-MPDU from MAC sublayer as a single PSDU. That is, the PSDU includes a plurality of MPDUs. Accordingly, the A-MPDU is transmitted through a wireless medium within a single PPDU.

802.11ad PHY and MAC Frame Structure

Hereinafter, a physical (PHY) and medium access control (MAC) frame structure to which the present invention can be applied will be described.

First, the physical layer configuration in the 802.11ad wireless LAN system to which the present invention can be applied will be described in detail.

The 802.11ad WLAN system supports three modulation modes (or modulation methods) as shown in Table 1.

TABLE 1

| PHY | MCS | Note |
|---|---|---|
| Control PHY | 0 | |
| Single carrier PHY (SC PHY) | 1, . . . , 12, 25, . . . , 31 | (low power SC PHY) |
| OFDM PHY | 13, . . . , 24 | |

The modulation modes of Table 1 can be used to satisfy different requirements (e.g., high throughput or stability).

In addition, the modulation modes of Table 1 may support only some modes depending on the system.

FIG. 3 is a diagram showing an example of a physical configuration of a radio frame to which the present invention can be applied.

All Directional Multi-Gigabit (DMG) physical layers may commonly include fields as shown in FIG. 3.

However, the fields included in the DMG physical layer may have a difference in the prescribed method of the individual fields and the used modulation/coding scheme depending on each mode.

As shown in FIG. 3, the preamble of the radio frame may include Short Training Field (STF) and Channel Estimation (CE).

In addition, the radio frame may include a header (or a header block), a data field corresponding to a payload, and a TRN (Training) field for beamforming selectively.

FIG. 4 shows an example of the Control PHY frame format.

Referring to FIG. 4, the control PHY frame comprises the Preamble, Header, Data field, and possibly AGC and TRN-R/T subfields.

The preamble is the part of the control PHY PPDU that is used for packet detection, AGC, frequency offset estimation, synchronization, indication of frame type and channel estimation.

The preamble comprises two parts: the Short Training field and the Channel Estimation field.

The Channel Estimation field is the same as the Channel Estimation field of the SC PHY.

Table 2 shows an example of Control PHY header fields.

TABLE 2

| Field name | Number of bits | Starting bit | Description |
| --- | --- | --- | --- |
| Reserved | 1 | 0 | Set to 0 (differential detector initialization). |
| Scrambler Initialization | 4 | 1 | Bits X1-X4 of the initial scrambler state. |
| Length | 10 | 5 | Number of data octets in the PSDU. Range 14-1023. |
| Packet Type | 1 | 15 | Corresponds to the TXVECTOR parameter PACKET-TYPE. Packet Type = 0 indicates either a packet whose data part is followed by one or more TRN-R subfields, or a packet that is requesting TRN-R subfields to be appended to a future response packet. Packet Type = 1 indicates a packet whose data part is followed by one or more TRN-T subfields. The field is reserved when the Training Length field is 0. |
| Training Length | 5 | 16 | Length of the training field. |
| Turnaround | 1 | 21 | Set to 1 or 0 |
| Reserved bits | 2 | 22 | Set to 0, ignored by the receiver. |
| HCS | 16 | 24 | Header Check sequence. |

FIG. 5 shows an example of an OFDM PHY frame format.

Referring to FIG. 5, the OFDM frame comprises the Short Training Field (STF), the channel estimation field (CE), the Header, OFDM symbols and optional training fields.

In the OFDM PHY frame, the preamble is followed by the PLOP header. The PLOP header consists of several fields that define the details of the PPDU being transmitted.

Table 3 shows an example of OFDM PHY header fields.

TABLE 3

| Field name | Number of bits | Start bit | Description |
| --- | --- | --- | --- |
| Scrambler Initialization | 7 | 0 | Bits X1-X7 of the initial scrambler state. |
| MCS | 5 | 7 | Index into the Modulation and Coding Scheme table. |
| Length | 18 | 12 | Number of data octets in the PSDU. Range 1-262 143. |
| Additional PPDU | 1 | 30 | Contains a copy of the parameter ADD-PPDU from the TXVECTOR. A value of 1 indicates that this PPDU is immediately followed by another PPDU with no IFS or preamble on the subsequent PPDU. A value of 0 indicates that no additional PPDU follows this PPDU. |
| Packet Type | 1 | 31 | Corresponds to the TXVECTOR parameter PACKET-TYPE. Packet Type = 0 indicates either a packet whose data part is followed by one or more TRN-R subfields, or a packet that is requesting TRN-R subfields to be appended to a future response packet. Packet Type = 1 indicates a packet whose data part is followed by one or more TRN-T subfields. The field is reserved when the Training Length field is 0. |
| Training Length | 5 | 32 | Corresponds to the TXVECTOR parameter TRNLEN. If the Beam Tracking Request field is 0, the Training Length field indicates the length of the training field. A value of 0 indicates that no training field is present in this PPDU. If the Beam Tracking Request field is 1 and the Packet Type field is 1, the Training Length field indicates the length of the training field. If the Packet Type field is 0, the Training Length field indicates the length of the training field requested for receive training. |
| Aggregation | 1 | 37 | Set to 1 to indicate that the PPDU in the data portion of the packet contains an A-MPDU; otherwise, set to 0. |
| Beam Tracking Request | 1 | 38 | Corresponds to the TXVECTOR parameter BEAM_TRACKING_REQUEST. Set to 1 to indicate the need for beam tracking; otherwise, set to 0. The Beam Tracking Request field is reserved when the Training Length field is 0. |
| Tone Pairing Type | 1 | 39 | Set to 0 to indicate Static Tone Pairing; Set to 1 to indicate Dynamic |

TABLE 3-continued

| Field name | Number of bits | Start bit | Description |
|---|---|---|---|
| | | | Tone Pairing. Only valid if MCS field value is in the range of 13 to 17; otherwise reserved. |
| DTP Indicator | 1 | 40 | Bit flip used to indicate DTP update. Only valid when the Tone Pairing Type field is 1 and the MCS field value is in the range of 13 to 17; otherwise reserved. |
| Last RSSI | 4 | 41 | Contains a copy of the parameter LAST_RSSI from the TX VECTOR. When set to 0, this field is reserved and ignored by the receiver. The value is an unsigned integer: Values of 2 to 14 represent power levels (−71 + value × 2) dBm. A value of 15 represents a power greater than or equal to −42 dBm. A value of 1 represents a power less than or equal to −68 dBm. Value of 0 indicates that the previous packet was not received a SIFS period before the current transmission. |
| Turnaround | 1 | 45 | As defined in Table 2. |
| Reserved | 2 | 46 | Set to 0, ignored by receiver |
| HCS | 16 | 48 | Header check sequence. |

Referring to Table 3, the OFDM PHY header includes information indicating an initial value of scrambling, MCS information, information indicating the length of data, information indicating whether additional PPDUs are present, information indicating a packet type, information indicating a training length, whether aggregation has occurred, the last RSSI, whether or not it is cut, and HCS (Header Check Sequence).

Also, the OFDM PHY header has 2 bits of reserved bits.

FIG. 6 shows an example of the SC PHY frame format.

Referring to FIG. 6, the SC(Single Carrier) PHY frame comprises the Short Training Field (STF), the channel estimation field (CE), the Header, SC blocks and optional training fields.

In the SC PHY frame, the preamble is followed by the header. The header consists of several fields that define the details of the PPDU to be transmitted.

Table 4 shows an example of the SC PHY header fields.

TABLE 4

| Field name | Number of bits | Start bit | Description |
|---|---|---|---|
| Scrambler Initialization | 7 | 0 | Bits X1-X7 of the initial scrambler state. |
| MCS | 5 | 7 | Index into the Modulation and Coding Scheme table. |
| Length | 18 | 12 | Number of data octets in the PSDU. Range 1-262 143. |

TABLE 4-continued

| Field name | Number of bits | Start bit | Description |
|---|---|---|---|
| Additional PPDU | 1 | 30 | Contains a copy of the parameter ADD-PPDU from the TXVECTOR. A value of 1 indicates that this PPDU is immediately followed by another PPDU with no IFS or preamble on the subsequent PPDU. A value of 0 indicates that no additional PPDU follows this PPDU. |
| Packet Type | 1 | 31 | See definition of Packet Type field in Table 3. |
| Training Length | 5 | 32 | Corresponds to the TXVECTOR parameter TRNLEN. If the Beam Tracking Request field is 0, the Training Length field indicates the length of the training field. A value of 0 indicates that no training field is present in this PPDU. If the Beam Tracking Request field is 1 and the Packet Type field is 1, the Training Length field indicates the length of the training field. If the Packet Type field is 0, the Training Length field indicates the length of the training field requested for receive training. |
| Aggregation | 1 | 37 | Set to 1 to indicate that the PPDU in the data portion of the packet contains an A-MPDU; otherwise, set to 0. |
| Beam Tracking Request | 1 | 38 | Corresponds to the TXVECTOR parameter BEAM_TRACKING_REQUEST. Set to 1 to indicate the need for beam tracking; otherwise, set to 0. The Beam Tracking Request field is reserved when the Training Length field is 0. |
| Last RSSI | 4 | 39 | Contains a copy of the parameter LAST_RSSI from the TX VECTOR. When set to 0, this field is reserved and ignored by the receiver. The value is an unsigned integer: Values of 2 to 14 represent power levels (−71 + value × 2) dBm. A value of 15 represents a power greater than or equal to −42 dBm. A value of 1 represents a power less than or equal to −68 dBm. Value of 0 indicates that the previous packet was not received a SIFS period before the current transmission. |
| Turnaround | 1 | 43 | As defined in Table 2. |
| Reserved | 4 | 44 | Set to 0, ignored by receiver |
| HCS | 16 | 48 | Header check sequence. |

Referring to Table 4, the SC PHY header includes information indicating an initial value of scrambling, MCS information, information indicating the length of data, information indicating whether additional PPDUs are present, information indicating a packet type, information indicating a training length, whether aggregation has occurred, the last RSSI, whether or not it is cut, and HCS (Header Check Sequence).

Also, the SC PHY header has 4 bits of reserved bits.

FIG. 7 shows an example of a MAC frame format, and FIG. 8 shows an example of a frame control field.

Specifically, FIG. 8a represents an example of a Frame Control field when Type is not equal to 1 or Subtype is not equal to 6, and FIG. 8b represents an example of a Frame Control field when Type is equal to 1 and Subtype is equal to 6.

Referring to FIG. 8, the first three subfields of the Frame Control field are Protocol Version, Type, and Subtype. The remaining subfields of the Frame Control field depend on the setting of the Type and Subtype subfields.

When the value of the Type subfield is not equal to 1 or the value of the Subtype subfield is not equal to 6, the remaining subfields within the Frame Control field are consists of the following subfields: Protocol Version, Type, Subtype, To DS, From DS, More Fragments, Retry, Power Management, More Data, Protected Frame, and Order. In this case, the format of the Frame Control field is illustrated in FIG. 8a.

When the value of the Type subfield is equal to 1 and the value of the Subtype subfield is equal to 6, the remaining subfields within the Frame Control field are the following: Control Frame Extension, Power Management, More Data, Protected Frame, and Order. In this case, the format of the Frame Control field is illustrated in FIG. 8b.

Table 5 shows an example of a type field and a subtype field format included in the Frame Control field.

TABLE 5

| Type value b3 b2 | Type description | Subtype value b7 b6 b5 b4 | Subtype description |
|---|---|---|---|
| 01 | Control | 0000-0101 | Reserved |
| 01 | Control | 0110 | Control Frame Extension |
| 11 | Extension | 0000 | DMG Beacon |
| 11 | Extension | 0001-1111 | Reserved |

In Table 5, the Control Frame Extension subtype is used to increase the subtype space by reusing bits b8-b11.

Table 6 shows an example of the Control Frame Extension field format.

TABLE 6

| Type value b3 b2 | Subtype value b7 b6 b5 b4 | Control Frame Extension value b11 b10 b9 b8 | Description |
|---|---|---|---|
| 01 | 0110 | 0000 | Reserved |
| 01 | 0110 | 0001 | Reserved |
| 01 | 0110 | 0010 | Poll |
| 01 | 0110 | 0011 | SPR |
| 01 | 0110 | 0100 | Grant |
| 01 | 0110 | 0101 | DMG CTS |
| 01 | 0110 | 0110 | DMG DTS |
| 01 | 0110 | 0111 | Grant ACK |
| 01 | 0110 | 1000 | SSW |
| 01 | 0110 | 1001 | SSW-Feedback |
| 01 | 0110 | 1010 | SSW-ACK |
| 01 | 0110 | 1011-1111 | Reserved |

The Protected Frame field is 1 bit in length. The Protected Frame field is set to 1 if the Frame Body field contains information that has been processed by a cryptographic encapsulation algorithm.

The Protected Frame field is set to 1 only within data frames and within management frames of subtype Authentication, and individually addressed robust management frames.

The Protected Frame field is set to 0 in all other frames, except in Control frames of subtype Control Frame Extension where this field is reserved.

When the Protected Frame field is equal to 1, the Frame Body field is protected utilizing the cryptographic encapsulation algorithm and expanded.

DMG Beamforming

Hereinafter, DMG beamforming will be briefly described. Beamforming (BF) is a mechanism that is used by a pair of STAs to achieve the necessary DMG link budget for subsequent communication. BF training is a bidirectional sequence of BF training frame transmissions that uses sector sweep and provides the necessary signaling to allow each STA to determine appropriate antenna system settings for both transmission and reception. After the successful completion of BF training, BF is said to be established. A BF training frame is an SSW frame, a DMG Beacon frame or a BRP frame.

FIG. 9 gives an example of the beamforming training procedure.

The STA that initiates BF training through the transmission of a BF frame is referred to as the initiator, and the recipient STA of the BF frame that participates in BF training with the initiator is referred to as the responder. For BF training that occurs within the A-BFT allocation, the PCP/AP is the initiator and a non-PCP/non-AP STA becomes the responder. For BF training that occurs during an SP allocation, the source DMG STA of the SP is the initiator and the destination DMG STA of the SP becomes the responder. For BF training during a TXOP allocation, the TXOP holder is the initiator and the TXOP responder is the responder.

The link from the initiator to the responder is referred to as the initiator link and the link from the responder to the initiator is referred to as the responder link.

BF training starts with a SLS from the initiator. A beam refinement protocol (BRP) may follow, if requested by either the initiator or the responder. The purpose of the SLS phase is to enable communications between the two participating STAs at the control PHY rate or higher MCS. Normally, the SLS phase provides only transmit BF training. The purpose of the BRP phase is to enable receiver training and enable iterative refinement of the AWV of both transmitter and receiver at both participating STAs. If one of the participating STAs chooses to use only one transmit antenna pattern, receive training may be performed as part of the SLS.

Any BF information obtained by an initiator or a responder during a BF training attempt shall be considered invalid if either or both of the following conditions are satisfied:

a) The SLS phase was not completed within dot11MaxBFTime beacon intervals from the start of the SLS phase.

b) The BRP phase, if initiated, was not completed within dot11MaxBFTime beacon intervals from the start of the BRP phase.

A STA shall abort an SLS if the SLS is not completed within dot11MaxBFTime beacon intervals from the start of the SLS, and shall abort a BRP if the BRP is not completed within dot11MaxBFTime beacon intervals from the start of the BRP.

The number of sectors per DMG antenna shall not be greater than 64. The total number of sectors across all DMG antennas in a STA shall not be greater than 128.

An SLS between an initiator and a responder is successful for the initiator if, after the completion of the SLS, the initiator receives a response to a frame transmitted to the responder using the sector and antenna selected during the SLS. The SLS is successful for the responder if, after the completion of the SLS, the responder receives a response to a frame transmitted to the initiator using the sector and antenna selected during the SLS.

The last negotiated Total Number of Sectors field, Number of RX DMG Antennas field, and RXSS Length field held by the initiator with respect to the responder refer to the last value for the corresponding field received by the initiator from the responder and that the SLS between the initiator and responder using this value was successful for the initiator. Similarly, the last negotiated Total Number of Sectors field, Number of RX DMG Antennas field, and RXSS Length field held by the responder with respect to the initiator refer to the last value for the corresponding field received by the responder from the initiator and that the SLS between the responder and initiator using this value was successful for the responder.

Until an SLS is successful between an initiator and a responder, the last negotiated Total Number of Sectors field, Number of RX DMG Antennas field, and RXSS Length field used by the initiator with respect to the responder refer to the value of these fields in the responder's DMG Capabilities element, and the last negotiated Total Number of Sectors field, Number of RX DMG Antennas field, and RXSS Length field used by the responder with respect to the initiator refer to the value of these fields in the initiator's DMG Capabilities element.

If an MMSL cluster capable STA has successfully transmitted to a peer STA an MMS element with the BeamLink Cluster field set to 1, then all MAC entities coordinated by the same MM-SME as the MMSL cluster capable STA shall use a single beamformed link for the MMSL cluster. Also, the MAC address used by the MMSL cluster capable STA to initiate the beamforming procedure shall remain the same until the completion of the beamforming procedure.

Sector-Level Sweep (SLS) Phase

The SLS phase can include as many as four components: an initiator sector sweep (ISS) to train the initiator link, a responder sector sweep (RSS) to train the responder link, an SSW Feedback, and an SSW ACK.

An initiator shall begin the SLS phase by transmitting the frames of the ISS.

A responder shall not begin transmitting the frames of an RSS before the ISS is successfully completed, except when the ISS occurs in the BTI.

An initiator shall not begin an SSW Feedback before the RSS phase is successfully completed, except when the RSS occurs in the A-BFT.

A responder shall not begin an SSW ACK with an initiator in the A-BFT. A responder shall begin an SSW ACK with an initiator immediately following the successful completion of the SSW Feedback with the initiator.

During the SLS phase the only BF frames an initiator may transmit are the DMG Beacon frame, the SSW frame, and the SSW-Feedback frame. During the SLS phase the only BF frames a responder may transmit are the SSW frame and the SSW-ACK frame.

If during the SLS the initiator and responder each execute a TXSS, then at the end of the SLS phase both the initiator and the responder possess their own transmit sector. If either the ISS or the RSS employs a receive sector sweep, then the responder or the initiator, respectively, possesses its own receive sector.

The following rule applies to all channel access in DMG BSSs. A STA shall not transmit a frame as part of a sector sweep comprising at least two sectors if a response is expected within SIFS interval from the STA identified in the RA field of the transmitted frame.

A STA shall not change its transmit power during a sector sweep.

Two examples of the SLS phases are shown in FIG. 10 and FIG. 11.

In FIG. 10 the initiator has many sectors, the responder has only one transmit sector and receive sector sweep is used at the responder sector sweep (the responder is transmitting all responder SSW frames through the same transmit sector, the initiator is switching receive antennas at the same time).

In FIG. 11 the initiator has many transmit sectors, the responder has one transmit sector. In this case, receive training for the initiator is performed in the BRP phase.

Initiator Sector Sweep

An ISS comprises either an initiator TXSS or an initiator RXSS.

An initiator RXSS may be performed in an ISS when the initiator chooses to use only one transmit antenna pattern across each of its DMG antennas.

An initiator may employ either DMG Beacon frames or SSW frames in the ISS. If the initiator begins an ISS with the transmission of a DMG Beacon frame, it shall use the DMG Beacon frame for all subsequent transmissions during the ISS. Conversely, if the initiator begins an ISS with the transmission of an SSW frame, it shall use the SSW frame for all subsequent transmissions during the ISS. A responder never begins an ISS.

The Duration field within each transmitted DMG Beacon frame is set to the time remaining until the end of the current BTI. The Duration field of each transmitted SSW frame shall be set to the time remaining until the end of the ISS or the end of the current allocation, whichever is earlier.

The initiator shall set the Direction subfield in the Sector Sweep field to 0 within each DMG Beacon and SSW frame transmitted during an ISS.

The initiator shall set the Total Sectors in ISS subfield within the SSW Feedback field to the total number of sectors that it is using in the ISS. The total is computed as the sum of all sectors employed on all antennas in the ISS multiplied by the number of the responder's receive DMG antennas. For example, if 4 sectors are used on antenna 0, 3 sectors on antenna 1, 5 sectors on antenna 2, and the responder has two receive DMG antennas, then the Total Sectors in ISS subfield is set to 24.

Initiator TXSS

When the IsInitiatorTXSS field for a specific SP is 1 in a received Extended Schedule element or Grant frame and the Beamforming Training field of the BF Control field for that SP in the same Extended Schedule element or Grant frame is 1, then the SP contains an initiator TXSS, and the initiator shall start an initiator TXSS at the start of the next SP as indicated by the received Extended Schedule element or Grant frame.

During the BTI, the initiator shall start an initiator TXSS.

During a CBAP, an initiator may obtain a TXOP with an initiator TXSS or may transmit a Grant frame to the responder with the Beamforming Training and IsInitiatorTXSS fields of the BF Control field set to 1. A responder that receives such a Grant frame in a CBAP and that has the Grant ACK Supported field equal to 1 in the responder's DMG Capabilities element shall respond with a Grant ACK frame SIFS interval after the reception of the Grant frame. In the Grant ACK frame, the responder shall set the Beamforming Training field to 1. The initiator starts the initiator TXSS SIFS interval after the reception of the Grant ACK frame if the Grant ACK Supported field in the responder's DMG Capabilities element is 1 or PIFS interval after the transmission the Grant frame otherwise. To transmit a Grant frame during a TXOP, the TXOP holder shall first terminate the TXOP by transmitting a CF-End frame followed by the transmission of the Grant frame PIFS interval after the end of the last CF-End frame transmission.

During an initiator TXSS, the Sector ID field in each BF frame shall be set to a value that uniquely identifies the transmit antenna sector employed when the BF frame is transmitted. The CDOWN field in each transmitted frame shall contain the total number of transmissions remaining until the end of the initiator TXSS, such that the last BF frame transmission of the initiator TXSS has the CDOWN field set to 0. Each transmitted BF frame shall be separated by a time interval equal to SBIFS, unless the allocation ends. This is indicated in FIG. 12.

If the initiator has more than one DMG antenna, the initiator transmits the BF frame through a number of sectors equal to the value of the last negotiated Total Number of Sectors field that was transmitted by the initiator to the responder. In each transmitted BF frame, the initiator shall set the Sector ID and DMG Antenna ID fields to uniquely identify the sector and the DMG Antenna ID, respectively, the initiator is using for the frame transmission and shall set the CDOWN field to the total number of transmissions remaining from all of the initiator's DMG antennas. The initiator shall transmit from its DMG antennas in increasing order of Antenna ID.

For an ISS outside the BTI and if the responder has more than one DMG antenna, the initiator repeats its initiator sector sweep for the number of DMG antennas indicated by the responder in the last negotiated Number of RX DMG Antennas field that was transmitted by the responder. Repetitions of the initiator sector sweep are separated by an interval equal to LBIFS time. In this case CDOWN indicates the number of sectors until the end of transmission from all initiator's DMG antennas to all responder's DMG antennas. At the start of an initiator TXSS, the responder should have its first receive DMG antenna configured to a quasi-omni pattern and should not change its receive antenna configuration for a time corresponding to the value of the last negotiated Total Number of Sectors field transmitted by the initiator multiplied by the time to transmit a single SSW frame, plus appropriate IFSs. After this time, the responder may switch to a quasi-omni pattern in another DMG antenna.

The initiator TXSS ends at the end time of the BF frame from the initiator with the CDOWN field set to 0. If the responder is unable to receive this frame, the responder shall assume that the initiator TXSS has completed at the expected end time of this frame.

Initiator RXSS

An initiator RXSS may be requested only when an initiator is aware of the capabilities of a responder, which includes the RXSS Length field. An initiator can obtain the capabilities of a responder using the Information Request and Response procedure.

When the IsInitiatorTXSS field for a specific SP in a received Extended Schedule element or Grant frame is 0 and the Beamforming Training field of the BF Control field for that SP in the same Extended Schedule element or Grant frame is 1, then the SP shall contain an initiator RXSS, and the initiator shall start an initiator RXSS at the start of the next SP described by the received Extended Schedule element or Grant frame.

The initiator never performs an initiator RXSS during the BTI.

During a CBAP, an initiator shall not obtain a TXOP with an initiator RXSS. Within a CBAP, an initiator may transmit a Grant frame to the responder with the Beamforming Training field set to 1 and the IsInitiatorTXSS field set to 0. A responder that receives such a Grant frame in a CBAP and that has the Grant ACK Supported field equal to 1 in the responder's DMG Capabilities element shall respond with a Grant ACK frame SIFS interval after the reception of the Grant frame. In the Grant ACK frame, the responder shall set the Beamforming Training field to 1. The initiator starts the initiator RXSS SIFS interval after the reception of the Grant ACK frame if the Grant ACK Supported field in the responder's DMG Capabilities element is 1 or PIFS interval after the transmission the Grant frame otherwise.

During the initiator RXSS, the initiator shall transmit from each of the initiator's DMG antennas the number of BF frames indicated by the responder in the last negotiated RXSS Length field transmitted by the responder.

Each transmitted BF frame shall be transmitted with the same fixed antenna sector or pattern. The initiator shall set the Sector ID and DMG Antenna ID fields in each transmitted BF frame to a value that uniquely identifies the single sector through which the BF frame is transmitted. The initiator shall set the CDOWN field in each transmitted BF frame to contain the total number of transmissions remaining to the end of the initiator RXSS, such that the last BF frame transmission of the initiator RXSS has the CDOWN field set to 0. Each transmitted BF frame shall be separated by a time interval equal to SBIFS, except if the allocation ends. This is indicated in FIG. 12.

During an initiator RXSS, the responder should have its receive antenna array configured to sweep RXSS Length sectors for each of the initiator's DMG antennas while attempting to receive SSW frames from the initiator.

The initiator RXSS ends at the end time of the SSW frame from the initiator with the CDOWN field set to 0.

If the responder is unable to receive this frame, the responder shall assume that the initiator RXSS has completed at the expected end time of this frame.

Responder Sector Sweep

An RSS comprises either a responder TXSS or a responder RXSS.

A responder RXSS may be performed in an RSS when the responder chooses to use only one transmit antenna pattern across each of its DMG antennas.

The responder initiates an RSS with the transmission of an SSW frame, which is the only frame allowed during an RSS.

The responder shall set the Direction subfield in the Sector Sweep field to 1 within each SSW frame transmitted during an RSS.

The Duration field within each transmitted SSW frame shall be set to the time remaining until the end of the RSS or the end of the current allocation (i.e., SP, TXOP or SSW slot in the case of the A-BFT), whichever comes first.

Responder TXSS

If the DMG Beacon immediately preceding an A-BFT contained a value of one in the IsResponderTXSS subfield of the Beacon Interval Control field, then the A-BFT is a responder TXSS A-BFT.

When the IsResponderTXSS field for a specific SP in a received Extended Schedule element or Grant frame is 1 and the Beamforming Training field of the BF Control field for that SP in the same Extended Schedule element or Grant frame is 1, then the SP contains a responder TXSS, and the responder shall initiate a TXSS following the completion of the ISS in the SP described by the received Extended Schedule element or Grant frame.

When the RXSS Length field within an SSW frame used to obtain a TXOP during a CBAP is 0, the responder shall initiate a TXSS following the completion of the ISS in the TXOP described by the received SSW frame.

During a responder TXSS, the responder shall set the Sector ID and the DMG Antenna ID fields in each transmitted SSW frame to a value that uniquely identifies the sector through which the SSW frame is transmitted. The initial value of CDOWN is set to the total number of sectors in the responder (covering all DMG antennas) multiplied by the number of DMG antennas at the initiator minus one. The responder shall set the CDOWN field in each transmitted SSW frame to contain the total number of transmissions remaining to the end of the responder TXSS, such that the last SSW frame transmission of the responder TXSS has the CDOWN field set to 0. The responder shall transmit from its DMG antennas in increasing order of Antenna ID. Each transmitted SSW frame shall be separated by an interval of time equal to SBIFS. Transmissions are not separated by SBIFS if the allocation ends or if the end of an SSW slot is reached or when the responder completed a full sweep of all its transmit sectors and is ready to transmit to another DMG antenna of the initiator. In the latter case, the next transmission is separated from the previous transmission by LBIFS interval. This is indicated in FIG. 13.

A responder that has more than one DMG antenna and has set the value of the DMG Antenna Reciprocity field in its DMG Capabilities element to 0 transmits sequentially through all the sectors of all of its DMG antennas. A responder that has more than one DMG antenna and has set the value of the DMG Antenna Reciprocity field in the responder's DMG Capabilities element to 1 transmits through the DMG antenna from which it had the best reception in the initiator sector sweep. The length of the sector sweep to each of the initiator's DMG antennas is not dependent on the value of the DMG Antenna Reciprocity field.

A responder that has only one DMG antenna should transmits through all its sectors, regardless of the setting of the DMG Antenna Reciprocity field.

The responder shall set the Sector Select field and the DMG Antenna Select field in each transmitted SSW frame to the value of the Sector ID field and DMG Antenna ID field, respectively, of the frame received with the best quality during the ISS. The determination of which frame is received with best quality is implementation dependent and beyond the scope of this standard. The responder shall set the SNR Report field to the SNR measured for the frame indicated by the Sector Select field and DMG Antenna Select field.

If the initiator has more than one DMG antenna, the responder repeats its responder sector sweep for the number of DMG antennas indicated by the initiator in the last negotiated Number of RX DMG Antennas field transmitted by the initiator. At the start of a responder TXSS, the initiator should have its receive antenna array configured to a quasi-omni antenna pattern in one of its DMG antennas for a time corresponding to the value of the last negotiated Total Number of Sectors field transmitted by the responder multiplied by the time to transmit a single SSW frame, plus any appropriate IFSs. After this time, the initiator may switch to a quasi-omni pattern in another DMG antenna.

The responder TXSS ends at the end time of the SSW frame from the responder with the CDOWN field set to 0. If the initiator is unable to receive this frame, the initiator shall assume that the responder TXSS has completed at the expected end time of this frame.

Responder RXSS

If the DMG Beacon immediately preceding an A-BFT contained a value of zero in the IsResponderTXSS subfield of the Beacon Interval Control field within the DMG Beacon, then the A-BFT is a responder RXSS A-BFT.

When the IsResponderTXSS field for a specific SP in a received Extended Schedule element or Grant frame is 0 and the Beamforming Training field of the BF Control field for that SP in the same Extended Schedule element or Grant frame is 1, then the SP contains a responder RXSS, and the responder shall initiate an RXSS following the completion of the ISS in the SP described by the received Extended Schedule element or Grant frame.

When the RXSS Length field within an SSW frame used to obtain a TXOP during a CBAP is equal to a nonzero value, the responder shall initiate an RXSS following the completion of the ISS in the TXOP described by the received SSW frame.

During the responder RXSS, the responder shall transmit the number of SSW frames indicated by the initiator in the initiator's most recently transmitted RXSS Length field (non-A-BFT) or FSS field (A-BFT) from each of the responder's DMG antennas, each time with the same antenna sector or pattern fixed for all SSW frames transmission originating from the same DMG antenna. The responder shall set the Sector ID and DMG Antenna ID fields in each transmitted frame to a value that uniquely identifies the sector and DMG antenna, respectively, through which the BF frame is transmitted. The responder shall set the CDOWN field in each transmitted SSW frame to contain the total number of transmissions remaining until the end of the responder RXSS, such that the last SSW frame transmission of the responder RXSS has the CDOWN field equal to zero. Each transmitted SSW frame shall be separated by an interval of time equal to SBIFS, except if the allocation ends or if the end of an SSW slot is reached. This is indicated in FIG. 13.

The responder shall set the Sector Select field and the DMG Antenna Select field in each transmitted SSW frame to the value of the Sector ID field and the DMG Antenna ID field, respectively, of the frame received with the best quality during the ISS. The determination of which frame is received with best quality is implementation dependent and beyond the scope of this standard.

At the start of a responder RXSS, the initiator should have its receive antenna array configured to sweep over RXSS Length sectors for each of the responder DMG antennas when it attempts to receive frames from the responder until the completion of the responder RXSS.

The responder RXSS ends at the end time of the SSW frame from the responder with the CDOWN field set to 0. If the initiator is unable to receive this frame, the initiator shall assume that the responder RXSS has completed at the expected end time of this frame.

Sector Sweep Feedback

Sector Sweep Feedback (SSW Feedback) occurs following each RSS.

During SSW Feedback, the initiator shall transmit an SSW-Feedback frame to the responder.

During SSW Feedback, the responder should have its receive antenna array configured to a quasi-omni antenna pattern in the DMG antenna through which it received with the highest quality during the ISS, or to the best antenna configuration it has found during RXSS if RXSS has been performed during the ISS, and should not change its receive antenna configuration when it communicates with the initiator until the expected end of the SSW Feedback.

When responder TXSS was performed during the preceding RSS, the initiator shall set the Sector Select field and the DMG Antenna Select field in the SSW-Feedback frame it transmits to the value of the Sector ID field and DMG Antenna ID field, respectively, of the frame received with the best quality during the responder TXSS. The determination of which frame is received with the best quality is implementation dependent and beyond the scope of this standard. In addition, the initiator shall set the SNR Report field to the SNR measured for the frame received by the sector and DMG antenna indicated by the Sector Select field and DMG Antenna Select field. The SSW-Feedback frame shall be transmitted through the sector identified by the value of the Sector Select field and DMG Antenna Select field received from the responder during the preceding responder TXSS.

When responder RXSS was performed during the preceding RSS, the Sector Select field and the DMG Antenna select field in the transmitted SSW-Feedback frame are reserved. The initiator shall set the SNR Report field to the SNR measured on the frame on the receive sector designated by the RSS.

The SSWFeedback frame shall be transmitted through the sector identified by the value of the Sector Select field received from the responder during its most recently completed RSS with the initiator.

In the transmitted SSW-Feedback frame, the initiator shall set the TX-TRN-REQ field to one if it desires to have transmitter training as part of the beam refinement phase and shall set the L-RX field to indicate the length of the training sequence it requests the responder to use in the beam refinement phase. If the initiator desires to carry out the MIDC subphase as part of the beam refinement, it shall set the BC-REQ field to 1 to request a BC subphase and shall set the MID-REQ field to 1 to request an MID subphase; in this case, the LRX field shall be set to indicate the number of receive AWVs the initiator uses during the MID subphase.

If the responder receives an SSW-Feedback frame from the initiator before it completes the RSS with the initiator, the responder may cease the RSS.

Sector Sweep ACK

When present, the Sector Sweep ACK (SSW ACK) occurs following an SSW Feedback.

When a responder TXSS is performed during an RSS, the responder shall transmit an SSW-ACK frame to the initiator to perform an SSW ACK. The SSW-ACK frame shall be transmitted through the sector identified by the value of the Sector Select field and the DMG Antenna Select field received from the initiator in the last SSW Feedback.

When an RXSS was performed during an RSS, an SSW-ACK frame shall be sent by the responder to the initiator. The SSW-ACK should be sent by the DMG antenna indicated in the DMG Antenna Select field in the last SSW-Feedback frame.

In the transmitted SSW-ACK frame, the responder shall set the TX-TRN-REQ field to one if it requires transmitter training as part of the beam refinement phase and shall set the L-RX field to indicate the length of the training sequence it requests the initiator to use in the beam refinement phase. If the responder desires to carry out a MID subphase, it sets the MID-REQ bit to 1 in the BRP Request field of the SSW frame. In this case, it shall also set the L-RX field to indicate the number of receive AWVs it uses during the MID subphase. If the responder desires to carry out a BC subphase, it sets the BC-REQ bit to 1. If the initiator has set either the MID-REQ or the BC-REQ fields to 1 in the SSW-Feedback frame, the responder may set the MID-Grant or the BC-Grant fields to 1, or both, to grant the requests.

At the start of an SSW ACK, the initiator should have its receive antenna array configured to a quasi-omni antenna pattern using the DMG antenna through which it received with the highest quality during the RSS, or the best receive sector if an RXSS has been performed during the RSS, and should not change its receive antenna configuration while it attempts to receive from the responder until the expected end of the SSW ACK.

Beamforming in BTI

In the BTI, the PCP/AP performs an initiator TXSS as the first part of the SLS with the transmission of at least one DMG Beacon frame. The PCP/AP does not transmit SSW frames in the BTI.

The PCP/AP may fragment the initiator TXSS over multiple consecutive BTIs by not transmitting a DMG Beacon frame through all sectors available to the PCP/AP in a single BTI. In a BTI with a fragmented initiator TXSS, the PCP/AP shall transmit DMG Beacon frames with the Fragmented TXSS field set to 1.

Otherwise, the PCP/AP shall set the Fragmented TXSS field to zero. The PCP/AP shall not change the duration of the next BTI if at least one of the DMG Beacon frames transmitted in the current BTI have the Fragmented TXSS field set to 1. The CDOWN field shall be set to the total number of transmissions remaining to the end of the initiator TXSS, such that the last DMG Beacon frame transmission of the initiator TXSS has the CDOWN field set to 0 (i.e., in a fragmented TXSS, the value of the CDOWN field covers the total number of transmissions remaining in the fragmented TXSS). The TXSS Span field shall be set to the total number of beacon intervals it takes the PCP/AP to complete the entire TXSS phase. The Duration field within each transmitted DMG Beacon shall be set to the time remaining until the end of the current BTI.

When a PCP/AP has more than one DMG antenna, the TXSS shall cover all the sectors in all DMG antennas. The TXSS Span field indicates the total number of beacon intervals it takes the PCP/AP to cover all sectors in all DMG antennas. The value of the TXSS Span field shall be lower than dot11MaximalSectorScan. The PCP/AP shall not change DMG antennas within a BTI. The PCP/AP has a regular schedule of transmitting through each DMG antenna.

From start until the completion of a TXSS phase, all DMG Beacon frames transmitted by the PCP/AP shall have the same value for all the subfields within the Beacon Interval Control field and DMG Parameters field.

Beamforming in A-BFT

Allocation of A-BFT

The PCP/AP shall allocate an A-BFT period MBIFS time following the end of a BTI that included a DMG Beacon frame transmission with Next A-BFT equal to 0.

Following the end of a BTI, the PCP/AP shall decrement the value of the Next A-BFT field by one provided it is not equal to zero and shall announce this value in the next BTI. When the Next A-BFT field in a transmitted DMG Beacon is equal to 0, the value of the A-BFT Length field is no less than aMinSSSlotsPerABFT. The PCP/AP may increase the Next A-BFT field value following a BTI in which the Next A-BFT field was equal to zero. A STA shall consider that a BTI is completed at the expiration of the value within the Duration field of the last DMG Beacon frame received in that BTI.

All DMG Beacon frames transmitted within the number of beacon intervals specified within the most recently updated TXSS Span field have the same value for all the subfields within the Beacon Interval Control field.

Operation During the A-BFT

Beamforming training in the A-BFT consists of the RSS and SSW Feedback of the SLS between the PCP/AP and a STA.

In the A-BFT, the PCP/AP is the initiator and the STA is the responder in the RSS part of the SLS.

The BRP phase shall not be performed within the A-BFT. A STA shall not transmit in the A-BFT of a beacon interval if it does not receive at least one DMG Beacon frame during the BTI of that beacon interval.

A DMG STA that receives a DMG Beacon frame with the Discovery Mode field equal to 1 and the CC Present field equal to 1 in the A-BFT following the BTI where the DMG Beacon frame is received if at least one of the following conditions is met:

The STA's MAC address is equal to the value of the A-BFT Responder Address subfield within the DMG Beacon.

The value of the A-BFT Responder Address subfield within the DMG Beacon is a group address of a group to which the STA belongs.

If none of these conditions is met following the reception of the DMG Beacon frame with the Discovery Mode field equal to 1 and the CC Present field equal to 1, the DMG STA shall not transmit in the A-BFT.

The A-BFT is slotted and the length of the A-BFT is an integral multiple of the sector sweep slot time. The structure of the A-BFT is shown in FIG. 14. The PCP/AP shall announce the size of the A-BFT in the A-BFT Length subfield of the Beacon Interval Control field, which shall be no less than aMinSSSlotsPerABFT sector sweep (SSW) slots. The first SSW slot begins at the start of the A-BFT, and the following SSW slots are adjacent and nonoverlapping. An SSW slot (FIG. 15) is a period of time within the A-BFT that can be used by a responder to transmit at least one SSW frame.

An SSW slot has a duration of aSSSlotTime. aSSSlotTime is defined to be, $$aSSSlotTime = aAirPropagationTime + aSSDuration + MBIFS + aSSFBDuration + MBIFS$$

The parameter aAirPropagationTime accounts for the propagation delay between the initiator and the responder. The parameter aSSDuration provides time for a responder to transmit up to the number of SSW frames announced in the FSS subfield of the Beacon Interval Control field in the DMG Beacon. The initiator shall set the FSS subfield of the Beacon Interval Control field in the DMG Beacon to a value that is no less than aSSFramesPerSlot. Finally, the parameter aSSFBDuration provides time for the initiator to perform SSW Feedback.

If the IsResponderTXSS subfield of the Beacon Interval Control field is equal to 1, the A-BFT shall be used to perform a responder TXSS. Otherwise, the A-BFT shall be used to perform a responder RXSS. In the case of a responder RXSS, the same slotted structure described above is used and the responder shall transmit the number of SSW frames announced in the FSS field in the DMG Beacon. If the PCP/AP allocates the A-BFT as a responder RXSS, it should set the value of the FSS field within the Beacon Interval Control to the number of receive sectors supported by the PCP/AP. The PCP/AP shall allocate the A-BFT as a responder TXSS at least once every dot11ABFTRTXSSSwitch beacon intervals in which an A-BFT is present.

At the start of each A-BFT, the responder(s) shall invoke a random backoff procedure to initiate or resume an RSS as follows. The random backoff procedure begins at the start of the A-BFT with the responder selecting a backoff count as a random integer drawn from a uniform distribution [0, A-BFT Length), i.e., 0 to A-BFT Length−1, where A-BFT Length is the value of the A-BFT Length field in the last received DMG Beacon. The responder shall decrement the backoff count by one at the end of each SSW slot, even if the CS function at the responder indicates the medium busy condition for that SSW slot. The responder may initiate the RSS only at the start of the SSW slot for which the backoff count is 0 at the beginning of the SSW slot.

The responder shall transmit no more SSW frames within an SSW slot than indicated in the value of the FSS subfield in the DMG Beacon. If the responder has more SSW frames to transmit as part of the RSS, but is not allowed to send any more SSW frames in the current SSW slot, then the responder may resume the RSS at the start of the following SSW slot provided that the A-BFT has not ended. If the responder cannot complete the RSS before the end of the A-BFT, it may use the same backoff procedure described above to resume the RSS at the next A-BFT for which the value of the IsResponderTXSS field is the same as the current A-BFT.

The initiator shall initiate an SSW Feedback to a responder at a time such that the beginning of the first symbol of the SSW-Feedback frame on the air occurs at aSSFBDuration+MBIFS before the end of the SSW slot. A responder that transmitted at least one SSW frame within a SSW slot shall be in quasi-omni receive mode for a period of aSSFBDuration ending MBIFS time before the end of the SSW slot. The initiator may initiate an SSW Feedback to the responder at an SSW slot even if the responder did not complete RSS within that SSW slot. If the initiator transmits an SSW-Feedback under this circumstance, it can transmit an Announce frame to the responder in an ATI. Following the reception of the Announce frame, the responder can respond with an SPR frame requesting time for the responder to continue with the RSS.

Alternatively, the responder can transmit an SPR frame to the PCP/AP in accordance with the channel access rules.

The information contained in an SSW-Feedback frame is based on the SSW frames received during the SSW slot in which the SSW-Feedback frame was transmitted. To communicate with each other following an SLS, an initiator and responder should use the information contained within the SSW-Feedback frame that had the highest value for the SNR Report field and was transmitted or received, respectively, as part of the most recent SLS between the initiator and responder.

A responder that receives an SSW-Feedback frame from the initiator during an A-BFT that was allocated with a DMG Beacon frame with Discovery Mode equal to 1 should not attempt to access the following aMaxABFTAccessPeriod A-BFT allocations to redo beamforming with the initiator, unless in the BTI preceding the A-BFT the responder receives a DMG Beacon frame that has the Discovery Mode field equal to 1, the CC Present field equal to 1 and the value of the A-BFT Responder Address subfield equal to the responder's MAC address. This allows other STAs the opportunity to successfully contend for A-BFT access and perform beamforming with the initiator.

The responder may attempt to restart the RSS within the same A-BFT if it does not receive a SSW-Feedback frame from the initiator by the end of the SSW slot in which it completes the RSS. To do this, the responder shall invoke the random backoff procedure beginning at the start of the SSW slot following the completion of the RSS. The responder shall select a backoff count as a random integer drawn from a uniform distribution [0, A-BFT Length), i.e., 0 to A-BFT Length−1, where A-BFT Length is the value of the A-BFT Length field in the last received DMG Beacon. The responder shall decrement the backoff count by one at the end of each SSW slot, even if the CS function at the responder indicates the medium busy condition for that SSW slot. The responder may restart the RSS at the start of the SSW slot for which the backoff count is 0 at the beginning of the SSW slot provided the A-BFT still has SSW slots available.

At the end of an A-BFT the responder shall cancel a backoff procedure that was started during the A-BFT, but has not been completed at the end of the A-BFT. As described above, the responder invokes a random backoff procedure at the start of each A-BFT.

RSS during A-BFTs but does not successfully receive an SSW-Feedback frame as a response. If FailedRSSAttempts exceeds dot11RSSRetryLimit, the STA shall select a backoff count as a random integer drawn from a uniform distribution [0, dot11RSSBackoff), i.e., 0 inclusive through dot11RSSBackoff exclusive. The responder shall decrement the backoff count by one at the end of each A-BFT period in the following beacon intervals. The responder may re-initiate RSS only during an A-BFT when the backoff count becomes zero. The STA shall set FailedRSSAttempts to 0 upon successfully receiving an SSWFeedback frame during the A-BFT.

In an A-BFT, the responder shall not initiate SSW ACK in response to the reception of a SSWFeedback frame from the initiator. The SSW ACK only occurs within the DTI of a beacon interval.

If the PCP/AP receives an SSW frame from the responder during the RSS with the Poll Required field within the SSW frame equal to 1 and the TDDTI field within the PCP/AP's DMG Capabilities element is 1, the PCP/AP shall allocate time for the responder and the PCP/AP to communicate during the ATI or within an SP of the DTI of at least one of the following aMinBTIPeriod beacon intervals beginning with the beacon interval in which the SSW frame was received. This can be done through the Extended Schedule element or the transmission of a Poll or Grant frame addressed to the responder, and the allocated time can be used for at least one of association, authentication, and service period request.

After transmitting an SSW-Feedback frame to the responder, the initiator shall send a BRP frame with the Capability Request subfield within the BRP Request field set to 1 and addressed to the responder. The BRP frame shall be sent in one of the following aMinBTIPeriod beacon intervals beginning with the beacon interval in which the RSS phase with the responder was last completed. The BRP frame shall be transmitted at MCS 0 using the sector identified by the Sector Select field received from the responder during the RSS.

In an ATI after the completion of the SSW Feedback, a responder should have its receive antenna configured to a quasi-omni antenna pattern in the DMG antenna in which it received the best sector from the initiator during the preceding ISS in order to receive an Announce, Grant, or BRP frame (with the Capability Request subfield within the BRP Request field set to 1) from the initiator, while the initiator should configure its transmit DMG antenna to the value of the Sector Select and the DMG Antenna Select fields received from the responder during the preceding RSS. If the responder does not receive an Announce or Grant frame from the initiator with the RA address equal to the responder's MAC address until aMinBTIPeriod beacon intervals after the beacon interval in which the SLS phase with the initiator was last attempted, it may retry BF with the initiator in the A-BFT.

Due to the multiple access nature of RSS in the A-BFT, the PCP/AP might not receive the best sector for communication with the STA. The PCP/AP may schedule an SP to perform BF again with the STA to find the best sector for communication with the STA.

STA Beamforming after A-BFT

The initiator shall either initiate BRP execution with the responder in the next CBAP or shall schedule time in the DTI for BRP execution with the responder if the initiator needs BRP training or the responder indicated a need for training (by setting any of the L-RX, TX-TRN-REQ, MID-REQ, or BC-REQ fields to a nonzero value) as a response to an SSW-Feedback or BRP frame with Capability Request subfield within the BRP Request field set to 1.

The responder may initiate BRP in a CBAP by sending a BRP frame with any of the training request fields (i.e., L-RX, TX-TRN-REQ, MID-REQ, BC-REQ) set to 1.

To schedule time in the DTI for BRP execution with the responder, the initiator shall transmit a Grant frame to the responder in one of the following aMinBTIPeriod beacon intervals beginning with the beacon interval in which the SLS phase with the responder was last completed. In the Grant frame, the initiator shall set the RA field to the MAC address of the responder and the TA field to the MAC address of the initiator. In the Dynamic Allocation Info field of the Grant frame, the AllocationType field shall be set to indicate SP, the source AID field shall be set to the AID of the initiator, the destination AID field shall be set to the broadcast AID and the Allocation Duration field shall be set to the expected duration of the BRP phase.

If the initiator receives at least one SSW frame from a responder within an A-BFT but did not transmit an SSW-Feedback frame to the responder within that A-BFT, the initiator may schedule time in the DTI for the responder to complete the RSS. To do that, the initiator shall transmit a Grant frame to the responder before the next A-BFT. In the Grant frame, the initiator shall set the RA field to the MAC address of the responder and the TA field to the MAC address of the initiator. In the Dynamic Allocation Info field of the Grant frame, the AllocationType field shall be set to indicate SP, the source AID field shall be set to the broadcast AID, the destination AID field shall be set to the AID of the initiator and the Allocation Duration field shall be set to cover for at least the remaining duration of the RSS.

The initiator may transmit an Announce frame to the responder during the ATI to announce a CBAP allocation in the beacon interval. If the responder receives the Announce frame with a CBAP allocation, the responder may contend for a TXOP during a CBAP to perform the BRP execution with the initiator or continue the RSS with the initiator.

Any Announce or Grant frames the initiator sends to a responder after initiating beamforming with the responder in the A-BFT but before beamforming with the responder is completed shall be transmitted at MCS 0 using the sector identified by the Sector Select field received from the responder in the RSS.

The execution of the beamforming procedure in an allocation in the DTI.

Beamforming in A-BFT with Multiple DMG Antennas

A PCP/AP shall receive through a quasi-omni antenna pattern from a single DMG antenna throughout an ABFT unless RXSS is used in the A-BFT, in which case it switches through antenna patterns.

A PCP/AP shall have an A-BFT every k beacon intervals, where k is the value indicated by the N BIs A-BFT subfield in the Beacon Interval Control field. In an A-BFT, the PCP/AP shall receive in a quasi-omni antenna pattern using the DMG antenna indicated by the value of the DMG Antenna ID subfield within the SSW field transmitted in the DMG Beacon. A PCP/AP with multiple DMG antennas has a regular schedule of receiving through each DMG antenna corresponding to the DMG antenna in which a DMG Beacon is transmitted through. The PCP/AP shall switch RX DMG antenna every I allocations, where I is the value of the N A-BFT in Ant subfield within the Beacon Interval Control field.

In each DMG Beacon, the A-BFT Count subfield in the Beacon Interval Control field indicates the number of A-BFTs that have passed since the PCP/AP last switched RX DMG antennas.

Hereinafter, a method for controlling overload situations proposed by the present invention will be described based on the contents of the foregoing.

That is, in the present invention, we reconsider the existing channel design and operation for association and propose the methods to handle congestion expected in dense and urban environments if existing operation is used.

Especially, association beamforming transmission (A-BFT-channel) was designed in IEEE 802.11ad to support the association of the stations to PCP/AP or to peer stations. It was designed with limited number of resources (e.g., time slots) to accommodate the random association attempts from the stations. Due to backward compatibility requirement, A-BFT channel will be used in IEEE 802.11ay. Many stations will compete for a limited number of resources that will inevitably entail overload condition, and thus the system throughput will dramatically be reduced.

In IEEE 802.11 ad, medium time within a DMG BSS is divided into beacon intervals. Subdivisions within the beacon interval are called access periods. FIG. 16 shows an example of access periods within a beacon interval comprising a beacon transmission interval (BTI), an association beamforming training (A-BFT), an announcement transmission interval (ATI), and two contention-based access periods (CBAPs) and scheduling periods (SPs) within the data transmission interval (DTI).

A-BFT is an access period during which beamforming training is performed with the STA that transmitted DMG Beacon frames during the preceding BTI. A DMG STA tries to associate with the PCP/AP STA or peer-STA that transmitted the beacon frames. When association is successful, both STAs know each other and know which sector direction gives the best signal reception quality. A-BFT consists of the number of slots over which a DMG STA randomly selects and transmits, and, in turn, a slot consists of mini-slots over which the sector sweep frames (SSW) are transmitted. The SSW frame contains information on sector ID and antenna ID with which the SSW frame is transmitted. FIG. 16 shows the one example of A-BFT structure. 3 stations (STA A, STA B, and STA C) randomly select a slot indexed between 0 and 7 and transmit over the slot. For exemplary purpose, STA A selects the slot #2, and STA B and C select the slot #5. Thus, STA B and C are not associated with PCP/AP due to collision. In IEEE 802.11ad, the number of slots is specified using A-BFT Length field in beacon interval control field in FIG. 17. The value of this field is in the range of 1 to 8, with the value being equal to the bit representation plus 1. The FSS field in FIG. 17 specifies the number of SSW frames allowed per slot. The value of this field is in the range of 1 to 16, with the value being equal to the bit representation plus 1.

As described in the above, the number of slots over which DMG STAs is limited, and to make the problem worse, EDMG STAs will also compete for slots with DMG STAs. We expect that the number of DMG and EDMG STAs will be large in certain operational scenarios such as dense office environments and urban outdoor environments being considered in IEEE 802.11ay. Hence, overload situation will be happened more frequently than the situation where only DMG STAs compete.

In this invention, we consider the methods to efficiently manage the overload situation with the requirement on backward compatibility in mind.

FIG. 17 illustrates an example of a beacon interval control field.

Referring to FIG. 17, the CC Present field is set to 1 to indicate that the Clustering Control field is present in the DMG Beacon.

Otherwise, the Clustering Control field is not present.

The Discovery Mode field is set to 1 if the STA is generating the DMG Beacon following the procedure (DMG Beacon generation before network initialization). Otherwise, this field is set to 0.

The Next Beacon field indicates the number of beacon intervals following the current beacon interval during which the DMG Beacon is not be present.

The ATI Present field is set to 1 to indicate that the announcement transmission interval (ATI) is present in the current beacon interval. Otherwise, the ATI is not present.

The A-BFT Length field specifies the size of the A-BFT following the BTI, and is defined in units of a sector sweep slot. The value of this field is in the range of 1 to 8, with the value being equal to the bit representation plus 1.

The FSS field specifies the number of SSW frames allowed per sector sweep slot. The value of this field is in the range of 1 to 16, with the value being equal to the bit representation plus 1.

The IsResponderTXSS field is set to 1 to indicate the A-BFT following the BTI is used for responder transmit sector sweep (TXSS). This field is set to 0 to indicate responder receive sector sweep (RXSS).

When this field is set to 0, the FSS field specifies the length of a complete receive sector sweep by the STA sending the DMG Beacon frame.

The Next A-BFT field indicates the number of beacon intervals during which the A-BFT is not be present. A value of 0 indicates that the A-BFT immediately follows this BTI.

The Fragmented TXSS field is set to 1 to indicate the TXSS is a fragmented sector sweep, and is set to 0 to indicate the TXSS is a complete sector sweep.

The TXSS Span field indicates the number of beacon intervals it takes for the STA sending the DMG Beacon frame to complete the TXSS phase. This field is always greater than or equal to one.

The N BIs A-BFT field indicates the interval, in number of beacon intervals, at which the STA sending the DMG Beacon frame allocates an A-BFT. A value of 1 indicates that every beacon interval contains an A-BFT.

The A-BFT Count field indicates the number of A-BFTs since the STA sending the DMG Beacon frame last switched RX DMG antennas for an A-BFT. A value of 0 indicates that the DMG antenna used in the forthcoming A-BFT differs from the DMG antenna used in the last A-BFT. This field is reserved if the value of the Number of RX DMG Antennas field within the STA's DMG Capabilities element is 1.

The N A-BFT in Ant field indicates how many A-BFTs the STA sending the DMG Beacon frame receives from each DMG antenna in the DMG antenna receive rotation. This field is reserved if the value of the Number of RX DMG Antennas field within the STA's DMG Capabilities element is 1.

The PCP Association Ready field is set to 1 to indicate that the PCP is ready to receive Association Request frames from non-PCP STAs and is set to 0 otherwise. This field is reserved when transmitted by a non-PCP STA.

PCP/AP may determine overload situation, e.g., by monitoring the utilization of SSW slots in A-BFT. When overload situation in A-BFT is determined, it is necessary to spread out access attempts over time. This will reduce the number of access attempts per A-BFT slot, thus increase the chance of no collision.

In IEEE 802.11ad, two parameters, dot11RSSRetryLimit and dot11RSSBackoff, are defined for A-BFT operation for 11 ad STAs.

dot11RSSRetryLimit specifies the number of consecutive A-BFT access attempts until successful association is achieved by DMG STA. If a DMG STA does not make successful association until dot11RSSRetryLimit is reached, it will back-off its access attempts for certain duration of the time that is determined by dot11RSSBackoff. The default values of dot11RSSRetryLimit and dot11RSSBackoff are 8 each.

FIG. 18 illustrates an example of a dot11RSSRetryLimit and a dot11RSSBackoff defined for A-BFT operation for 11 ad STAs.

DMG STA randomly picks the numbers in [0, dot11RSSRetryLimit−1] and [0, dot11RSSBackoff−1). Note that dot11RSSRetryLimit is "1" means immediate back-off and dot11RSSBackoff is "1" means immediate returning to the access attempt.

dot11RSSRetryLimit and dot11RSSBackoff are not easily adjustable parameters in IEEE 802.11ad.

This is because the dot11RSSRetryLimit and dot11RSSBackoff values defined in the 802.11ad are set to the default values and built in the chipset.

If a change for the default values is required, the default values may only be possible by changing an MAC layer Management Element (MLME).

However, this change can take a lot of time, so it may not help in the above mentioned overload situation.

Therefore, the method proposed in the present invention has an object to propose a method of changing the parameters more rapidly through Over-the-Air (OTA).

That is, the objective of the method proposed in the present invention is to define and to deliver "dot11RSSRetryLimit and dot11RSSBackoff"-like parameters for IEEE 802.11 ay STAs that are easily adjustable.

In this invention, we denote them as RSSRetryLimit[ay] and RSSBackoff[ay].

The RSSRetryLimit[ay] and the RSSBackoff[ay] can be represented by a first control information and a second control information, respectively.

They can be smaller or larger than the corresponding values (dot11RSSRetryLimit and dot11RSSBackoff) used in 802.11 ad.

Hereinafter, in an access period (e.g., A-BFT) in which beamforming training proposed in this specification is performed, a detailed method for solving that an overload situation occurs will be described.

That is, this specification provides a method of newly defining and signaling parameters of RSSRetryLimit[ay] and RSSBackoff[ay] to enable an overload situation not to occur in the A-BFT.

First Exemplary Embodiment

The first exemplary embodiment provides a method of signaling parameters of the RSSRetryLimit[ay] and the RSSBackoff[ay] proposed in this specification using a beacon frame body.

At first, define at least 3 octets (or bytes) "Information Element" (1 for Element ID, 1 for RSSRetryLimit[ay], and 1 for RSSBackoff[ay], respectively) in DMG Beacon Frame Body shown in FIG. 19.

FIG. 19 illustrates an example of a DMG beacon frame body.

The Information Element including Element ID, RSSRetryLimit[ay], and RSSBackoff[ay] can be included in an Extended Schedule field shown in FIG. 19

Or, the Information Element (IE) including Element ID, RSSRetryLimit[ay], and RSSBackoff[ay] can be represent to an enhanced DMG (EDMG) operation element (format).

And, the Information Element (IE) can be included in a management frame (e.g. beacon frame).

The RSSRetryLimit[ay] and RSSBackoff[ay] parameters have the range of 1 to 256, with the value being equal to the bit representation plus 1.

Note that they can be preset as the same range of values as in 802.11ad, 1 to 16.

Also, use one reserved bit (say B44) as overload indicator bit in beacon interval control field shown in FIG. 17.

When it is set to "1", EDMG STAs read Information Element defined in 1.

Then, EDMG STAs apply RSSRetryLimit[ay] and RSSBackoff[ay] values in Information Element for consecutive access attempts and back-off, respectively.

FIG. 20 is a flowchart illustrating an example of a method of solving an overload situation proposed in this specification.

First, a station (STA) receives a beacon frame from an AP (S2010).

The STA may be represented with an enhanced STA and an EDMG STA, and the AP may be represented with a PCT/AP and an enhanced AP.

The beacon frame includes at least one of control information related to an access attempt of beamforming training or an overload indicator.

The overload indicator represents whether an overload situation has occurred.

The control information includes first control information and second control information.

The first control information indicates the number of consecutive access attempt(s) until a successful association of the beamforming training is achieved, and the second control information indicates a back-off value of the access attempt if the association is not successful.

The overload indicator may be included in a beacon interval control field of a beacon frame body, and the control information may be included in an Extended Schedule field of the beacon frame body.

Thereafter, when the overload indicator represents that an overload situation has occurred (e.g., when the overload indicator is set to '1'), the STA determines (or reads) first control information and second control information included in the control information (S2020).

Here, when the overload indicator represents that an overload situation has occurred, the control information may be included in the beacon frame.

Thereafter, the STA performs beamforming training with the AP based on the first control information and the second control information included in the control information (S2030).

Step S2030 includes that the STA applies first control information and second control information included in the beacon frame.

That is, the STA performs an access attempt by a value set to the first control information until a successful association with the AP is achieved and performs back-off by a value set to the second control information.

Second Exemplary Embodiment

The second exemplary embodiment represents a method of defining control information (e.g., RSSRetryLimit[ay], RSSBackoff[ay]) described in the first exemplary embodiment using a reserved bit included in a beacon interval control field.

The control information may be represented using 1 bit, 2 bits, and 3 bits of reserved bits of the beacon interval control field.

Table 7 to be described later represents an example in which the control information is represented with 2 bits, and Table 8 represents an example in which the control information is represented with 3 bits.

Hereinafter, the second exemplary embodiment will be described in detail.

As mentioned, the second embodiment uses the reserved bits in the beacon interval control field shown in FIG. 17.

Depending on the number of reserved bits used, back-off and/or consecutive access attempts can be preset.

Table 7 shows the example mapping of back-off values or consecutive retry values when two reserved bits (B44 and B45) are used.

Back-off values are for example and another example may be {8, 16, 24, 32}. Retry limit values may be decreasing order {8, 6, 4, 2} in Table 7.

Note that "00" specifies the same back-off value with IEEE 802.11ad STAs. Any combination of two reserved bits can be used.

For example, B46 and B47 may be used for the same purpose.

Either of two columns (Back-off for EDMG STAs, Consecutive Retry for EDMG STAs) can be used.

TABLE 7

| B44 | B45 | Back-off for EDMG STAs | Consecutive Retry for EDMG STAs |
|---|---|---|---|
| 0 | 0 | 8 (No change with 802.11 ad) | 8 (No change with 801.11 ad) |
| 0 | 1 | 12 | 2 |

TABLE 7-continued

| B44 | B45 | Back-off for EDMG STAs | Consecutive Retry for EDMG STAs |
|---|---|---|---|
| 1 | 0 | 16 | 4 |
| 1 | 1 | 24 | 6 |

Table 7 illustrates example mappings of back-off values and consecutive retry values when 2 reserved bits (B44 and B45) in beacon interval control field shown in FIG. 17 are used.

FIG. 21 illustrates an example operation of dynamic back-off control.

FIG. 21 shows the transition of back-off values depending on the overload situation. For example, when the overload situation is resolved, the back-off value will be back to default value (say "00" here) from any other value.

Transition to a longer back-off value will be executed when the overload situation is not improved for a certain period of time. When the overload situation is somewhat relieved, but still premature to declare "Overload situation is resolved" for a certain period of time, then the current back-off value is maintained.

Table 8 shows the example mapping of consecutive retry and back-off values when 3 reserved bits (B44, B45, and B46) are used. When we use all the reserved bits in beacon interval control field, a finer granularity of consecutive retry and back-off values can be implemented.

TABLE 8

| B44 | B45 | B46 | Consecutive Retry for EDMG STAs | Back-off for EDMG STAs |
|---|---|---|---|---|
| 0 | 0 | 0 | 8 | 8 |
| 0 | 0 | 1 | 8 | 12 |
| 0 | 1 | 0 | 8 | 16 |
| 0 | 1 | 1 | 8 | 24 |
| 1 | 0 | 0 | 4 | 16 |
| 1 | 0 | 1 | 4 | 20 |
| 1 | 1 | 0 | 4 | 24 |
| 1 | 1 | 1 | 4 | 32 |

Table 8 illustrates an example mapping of both consecutive retry and back-off values when 3 reserved bits (B44, B45, and B46) in beacon interval control field shown in FIG. 17 are used.

TABLE 9

| | Pros. | Cons. |
|---|---|---|
| Method 1 | No change to legacy DMG STA Can save the reserved bits for other purpose | Beacon frame will have additional information. Decoding complexity may be increased |
| Method 2 | No change to legacy DMG STA Maintain the DMG beacon Efficient operation | Use of the limited reserved bits |

Table 9 illustrates comparison between the first embodiment (Method 1) and the second embodiment (Method 2).

It is worthwhile to mention that the proposed methods can be used in conjunction with other possible approaches. For example, dedicated resources may be allocated for EDMG STAs. However, due to uncertainty in estimating how much resources will be allocated and limited available resources, e.g., limited number of bits for a finer granularity assignments, there will inevitably be inefficiency.

In such cases, the proposed methods can be used to compensate the inefficiency. One example is that 4 bits are required for fine resource allocations to reduce the inefficiency, but only 2 bits are available.

Coarse granularity can introduce the delay in resolving the collision situation and the proposed methods in this invention, e.g., dynamic control of the back-off limit, can help the system to get out of the collision process quickly.

When only "1" reserved bit is used for changing the range of consecutive retries and back-offs for EDMG STAs, it will merely inform EDMG STAs of overload situation. EDMG STA then may execute predefined set of operations. One example operation is:

1. Choose the next larger value of RSSRetryLimit or/and the next smaller value of RSSBackoff prestored, for example, as in Table 7.

2. Count overload indications through the reserved bit. When a certain number of consecutive "1" is observed, choose the next larger value of RSSRetryLimit or/and the next smaller value of RSSBackoff prestored. This process will continue until the overload situation is resolved.

3. No overload situation is identified by setting "0" in the reserved bit, RSSRetryLimit or/and RSSBackoff values will be back to default values or smaller values than current ones.

By observing the fact that a dedicated resource for EDMG STAs is not precluded, we can consider another method to handle the situation we want to resolve in this invention.

FIG. 22 is a flowchart illustrating another example of a method of solving an overload situation proposed in this specification.

First, the station (STA) receives a beacon frame from the AP (S2210).

The STA may be represented with an enhanced STA and an EDMG STA, and the AP may be represented with a PCT/AP and an enhanced AP.

The beacon frame includes at least one of control information related to an access attempt of beamforming training or an overload indicator.

The overload indicator represents whether an overload situation has occurred.

The control information includes a first bit and a second bit. Alternatively, the control information may be divided into a first bit and a second bit.

The first bit indicates the number of consecutive access attempt(s) until a successful association of the beamforming training is achieved, and the second bit indicates a back-off value of the access attempt if the association is not successful.

Alternatively, the control information may be represented with only 1 bit.

In this case, the control information has a predetermined value, and the predetermined value may have a mapping relation with the number of consecutive access attempts and a back-off value.

For example, when the predetermined value is 'x(integer)', the number of the consecutive access attempts may be '3', and the back-off value may be '2'.

The control information may be configured with 2 bits and 3 bits.

The control information may be configured with using a reserved bit of a beacon interval control field.

Thereafter, the STA determines whether an overload situation has occurred through an overload indicator received through the beacon frame (S2220).

As the determination result, when the overload indicator represents that an overload situation has occurred (e.g., when an overload indicator is set to '1'), the STA selects a next larger value than a value of a previously stored first bit and selects a next smaller value than a value of a previously stored second bit (S2230).

Until an overload situation is solved, the STA repeatedly performs step S2230.

That is, the STA changes a value of the first bit and a value of the second bit by the receiving numbers of an overload indicator representing that an overload situation has occurred.

Thereafter, when the overload situation is solved (i.e., when the overload indicator represents that an overload situation has not occurred), the STA sets each of values of a first bit (RSSRetryLimit) and a second bit (RSSBackoff) changed by step S2220 to a default value or sets each of values of a first bit (RSSRetryLimit) and a second bit (RSSBackoff) to a smaller value than a currently preset value (S2240).

Third Exemplary Embodiment

The third exemplary embodiment allocates an additional A-BFT segment (or slot) for EDMG STAs, thereby providing a method for solving an overload situation.

According to the third exemplary embodiment, the DMG STA uses only legacy A-BFT, and the EDMG STA performs beamforming training using both legacy A-BFT and additional A-BFT.

The third exemplary embodiment will be described in detail.

At first, a PCP/AP allocates additional time slots for EDMG STAs to the legacy A-BFT. Information on this allocation, e.g., number of additional slots, etc., can be delivered to EDMG STAs.

For example, some subset of reserved bits in beacon interval control field can be used. FIG. 23 shows example of access periods within a beacon interval in which additional A-BFT is allocated only for EDMG STAs and Table 10 shows the example allocations of additional A-BFT (in slots) using 2 reserved bits in beacon interval control field.

Let DMG STAs access only to the legacy A-BFT (2310) and EDMG STAs to the legacy A-BFT plus additional A-BFT (2320). Hence, EDMG STAs may have a larger number of accessible slots than DMG STAs have. Note that if additional A-BFT is not allocated, then DMG and EDMG STAs have the same number of accessible slots. Denote the total number of slots as "A-BFT Total Length=A-BFT Length+A-BFT Length New" where A-BFT Length is the number of slots for legacy A-BFT (up to 8 slots) and A-BFT Length New is the number of slots for additional A-BFT (its number can be configurable).

FIG. 23 illustrates example of access periods with additional A-BFT.

TABLE 10

| B44 | B45 | Additional A-BFT for EDMG STAs (Slots) | Additional A-BFT for EDMG STAs (Slots) |
|---|---|---|---|
| 0 | 0 | 0 | 0 |
| 0 | 1 | 4 | 2 |
| 1 | 0 | 8 | 4 |
| 1 | 1 | 16 | 8 |

Table 10 illustrates example allocations of additional A-BFT using 2 reserved bits in beacon interval control field.

Then, DMG STAs randomly select the slot for access between [0, A-BFT Length−1] and EDMG STAs STAs randomly select the slot for access between [0, A-BFT Total Length−1]

When EDMA STA chooses the slot between [0, A-BFT Length−1], it will follow the same slot structure (slot duration, number of sub-slots comprising the slot, sub-slot duration (SSW duration in FIG. 14), time gap between the sub-slots, etc.) as defined in 801.11ad for DMG STAs.

When EDMG STA chooses the slot between [A-BFT Length, A-BFT Total Length−1], it may follow the different slot structure (slot duration, number of sub-slots comprising the slot, sub-slot duration (SSW duration in FIG. 14), time gap between the sub-slots, etc.) as defined in 801.11ad for DMG STAs.

If collision happens to an EDMG STA, the following two operations can be considered:

EDMG STA simply follows consecutive access attempts and then back-off if those attempts are not successful.

EDMA STA may try another access attempt(s) within the same A-BFT by selecting the slot(s) between [slot index last failed+1, Total A-BFT Length−1].

Another implementation is to use the same range of [0, Total A-BFT Length−1]. If the selection gives the number that is larger than the remaining slots within the same A-BFT, then delay the access attempt until the next A-BFT allocation in some beacon interval or back-off. Otherwise, go to the slot index selected. This can be repeated until selection gives the larger number than the number of remaining slot.

Another implementation is that EDMG STA may try another access attempt(s) within the same A-BFT by selecting the slot(s) between [A-BFT Length, Total A-BFT Length−1]. If the slot index of additional A-BFT for EDMG STAs starts from "0", then the range in additional A-BFT will be [0, A-BFT Length New−1].

In order to treat DMG and EDMG STAs fairly, RSSRetryLimit[ay] and RSSBackoff[ay] for EDMG STAs can be adjusted. For example, a longer back-off value can be allocated to EDMG STAs while giving more access opportunity by additional A-BFT. Another example is to assign a smaller value for consecutive retry attempts. It is noted that both consecutive retry limit and back-off limit can jointly be adjusted. This can be done using the proposed method 1 or 2 in this invention.

For easy of resource allocation, disjoint resources (slots) can be assigned for DMG and EDMG STAs, respectively. DMG STAs can access slots in legacy A-BFT channel, and EDMG STAs can access slots in additional A-BFT channel. Since the slots in additional A-BFT channel are accessible by EDMG STAs, different slot structure may be used. For example, different slot duration, different number of transmissions in the slot by adjusting the duration of transmission (duration of sub-slot in the slot), and/or different time gap between transmissions in the slot compared to 802.11 ad for DMG STAs can be used.

Another aspect to note is that the proposed methods can be applied over the case where multiple channels are used for association. The same or different values of consecutive retry limit and back-off limit from the same predefined set can be applied over the multiple channels. For example, channel 1 (primary channel) can use "12" beacon intervals from which back-off value is selected in the range of [0, 12-1], while channel 2 (secondary channel) can use "8" for the same purpose in which the range will be [0, 8-1]. Note that DMG STAs will only access the primary channel and EDMG STAs will access both the primary and secondary channels, thus the access attempts from EDMG STAs will be spread over the channels.

The efficiency of introducing additional slots for EDMG STAs will be depend on the estimation accuracy on the ratio of DMG STAs to EDMG STAs. One possible way to estimate is to use information delivered by successfully associated STAs. For example, the associated STAs can provide information on, e.g., type of the STA (DMG or EDMG), how many access attempts have been done until the association, and/or elapsed time until the association from initial access attempt, etc. We can consider information as "historical data" experienced by the STA during access attempts.

FIG. 24 is a flowchart illustrating an example of a method for performing beamforming training between an STA and an AP proposed in the present specification.

At first, an enhanced STA (station) receives, from the PCP/AP (Personal basic service set Control Point/Access Point), a beacon frame during a beacon interval (S2410).

The enhanced STA can be represented to an EDMG (Enhanced Directional Multi-Gigabit) STA device.

The beacon frame can include information element (IE) used for an enhanced directional multi-gigabit (EDMG) operation.

The EDMG is an operation in a frequency band containing a channel with a channel starting frequency above a specific frequency.

The specific frequency can be a 45 GHz.

Here, the IE includes control information related to an access attempt of the A-BFT.

Here, the control information includes a first control information and a second control information.

The first control information indicates a value of retry limit that the enhanced STA device attempting to access the A-BFT uses, and the second control information indicates a back-off value that the enhanced STA device uses when the consecutive number of failed attempts to access the A-BFT exceeds the retry limit indicated by the first control information.

Then, the enhanced STA performs the A-BFT with the PCP/AP based on the received IE (S2420).

S2420 comprises the following procedures.

That is, the enhanced STA selects at least one slot performing the A-BFT (S2421).

The A-BFT can be performed during a specific access period.

And then, the enhanced STA transmits, to the PCP/AP, an SSW (sector sweep) frame through at least one sub-slot included in the selected slot (S2422).

The control information can be represented to an enhanced DMG (EDMG) operation element (format).

The first control information indicates the number of consecutive access attempt(s) until a successful association of the beamforming training is achieved, and the second control information indicates a back-off value of the access attempt if the association is not successful.

And, said step of S2420 further comprises the following procedures.

The enhanced STA attempts an access with the PCP/AP based on the first control information.

Then, the enhanced STA back-offs the access attempt for certain duration of the time that is determined by the second control information if the access attempt is not successful.

The control information is included in an extended schedule field of a beacon frame body, the beacon frame body included in the beacon frame.

The beacon frame comprises an overload indicator that indicates whether an overload situation occurs.

Here, if the overload indicator is included in a beacon interval control field of the beacon frame body.

And, if the overload indicator indicates that the overload situation has occurred, the control information is included in the extended schedule field.

In another aspect of the present invention, the control information can comprise a first bit and a second bit.

The first bit indicates the number of consecutive access attempt(s) until a successful association of the beamforming training is achieved, and the second bit indicates a back-off value of the access attempt if the association is not successful.

The beacon frame comprises an overload indicator indicates that the overload situation occurs.

The first control information is set to the next larger value of previous first control information, and the second control information is set to the next smaller value of previous second control information.

S2420 can be performed if the overload indicator is transmitted a predetermined number.

The back-off value also increases with increase in the value of the control information.

The second control information can be set a default value if the overload situation is resolved.

In another aspect of the present invention, the specific access period can comprise a first access period and a second access period.

The first access period is related to an access attempt of a legacy STA device, and the second access period is related to an access attempt of the enhanced STA device.

In that case, the enhanced STA can receive information indicating the number of slot included in the second access period additionally.

Also, the enhanced STA can select a first slot in the first access period and a second slot in the second access period.

The first slot and the second slot have a different slot frame structure.

If multiple channels are used in the access attempt, the first control information and the second control information have same or different values per each channel.

General Apparatus to which the Present Invention May be Applied

FIG. 25 is a block diagram exemplifying a wireless apparatus according to an embodiment of the present invention.

Referring to FIG. 25, an apparatus 2510 according to the present invention may include a processor 2511, a memory 2512, and a radio frequency (RF) unit 2513. The apparatus 2510 may be an AP or a non-AP STA for implementing the embodiments of the present invention.

The RF unit 2513 is connected to the processor 2511 to transmit and/or receive a wireless signal. For example, the RF unit 2513 may implement the physical layer according to the IEEE 802.11 system.

The processor 2511 is connected to the RF unit 2513 to implement the physical layer and/or MAC layer according to the IEEE 802.11 system. The processor 2511 may be configured to perform the operations according to the various embodiments of the present invention according to FIGS. 1 to 25 above. In addition, a module that implements the operations of the AP and/or the STA according to the various embodiments of the present invention according to FIGS. 1 to 25 above may be stored in the memory 2512 and executed by the processor 2511.

The memory 2512 is connected to the processor 2511 and stores various pieces of information for driving the processor 2511. The memory 2512 may be included in the processor 2511, or installed exterior to the processor 2511 and connected to the processor 2511 with a known means.

Further, the apparatus 2510 may have a single antenna or multiple antennas.

Such a detailed configuration of the apparatus 2510 may be implemented such that the features described in various embodiments of the present invention described above are independently applied or two or more embodiments are simultaneously applied.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

In the wireless communication system, the example in which the association method is applied to the IEEE 802.11 system is primarily described, but the association method can be applied to various wireless communication systems in addition to the IEEE 802.11 system.

What is claimed is:

1. A method for performing association beamforming training (A-BFT) between an enhanced STA (station) device and a PCP/AP (Personal basic service set Control Point/Access Point) device in a wireless communication system, the method performed by the PCP/AP device, comprising:

transmitting, to the enhanced STA device, a beacon frame during a beacon interval,
wherein the beacon frame includes an information element (IE) used for an enhanced directional multi-gigabit (EDMG) operation; and
performing the A-BFT with the enhanced STA device based on the IE,
wherein the IE includes control information for an access attempt of the A-BFT,
wherein the control information includes first control information and second control information, and
wherein the first control information represents a value of retry limit that the enhanced STA device attempting to access the A-BFT uses, and the second control information represents a back-off value that the enhanced STA device uses when a consecutive number of failed attempts to access the A-BFT exceeds the retry limit specified by the first control information.

2. The method of claim 1, wherein the performing the A-BFT comprises:
selecting at least one slot performing the A-BFT; and
receiving, from the enhanced STA device, an SSW (sector sweep) frame through at least one sub-slot included in a slot,
wherein the slot is a slot for performing the A-BFT.

3. The method of claim 1, wherein the enhanced STA device is an enhanced directional multi-gigabit (EDMG) STA device.

4. The method of claim 1, wherein the control information is included in an extended schedule field of a beacon frame body, the beacon frame body included in the beacon frame.

5. The method of claim 1, wherein the beacon frame comprises an overload indicator that indicates whether an overload situation occurs.

6. The method of claim 5, wherein the overload indicator is included in a beacon interval control field of a beacon frame body.

7. The method of claim 6, wherein if the overload indicator indicates that the overload situation has occurred, the control information is included in an extended schedule field of the beacon frame body.

8. The method of claim 1, wherein the control information comprises a first set of bits and a second set of bits, and
wherein the first set of bits indicates the number of consecutive access attempts until a successful A-BFT is achieved, and the second set of bits indicates a back-off value of the access attempt if the A-BFT is not successful.

9. The method of claim 1, wherein the beacon frame comprises an overload indicator that indicates whether an overload situation occurs, and
wherein the first control information is set to a next larger value of previous first control information, and the second control information is set to a next smaller value of previous second control information.

10. The method of claim 9, wherein the A-BFT is performed if the overload indicator is transmitted a predetermined number of times.

11. The method of claim 1, wherein the back-off value of the second control information also increases with increase in the value of the first control information.

12. The method of claim 1, wherein the first control information and the second control information are set as default values if an overload situation is resolved.

13. The method of claim 1, wherein the A-BFT is performed during a specific access period,
wherein the specific access period comprises a first access period and a second access period, and
wherein the first access period is related to an access attempt of a legacy STA device, and the second access period is related to an access attempt of the enhanced STA device.

14. The method of claim 13, further comprising:
transmitting, to the enhanced STA device, information for a number of at least one slot included in the second access period.

15. The method of claim 1, wherein if multiple channels are used in the access attempt, the first control information and the second control information have same or different values per each channel.

16. The method of claim 1, wherein the EDMG operation is an operation in a frequency band containing a channel with a channel starting frequency above a specific frequency.

17. A personal basic service set control point/access point (PCP/AP) device for performing association beamforming training (A-BFT) with an enhanced STA (station) device in a wireless communication system, the PCP/AP device comprising:
a transceiver configured to transceive a radio signal; and
a processor operably coupled to the transceiver,
wherein the processor is configured to:
transmit, to the enhanced STA device, a beacon frame during a beacon interval,
wherein the beacon frame includes an information element (IE) used for an enhanced directional multi-gigabit (EDMG) operation; and
perform the A-BFT with the enhanced STA device based on the IE,
wherein the IE includes control information for an access attempt of the A-BFT,
wherein the control information includes first control information and second control information, and
wherein the first control information represents a value of retry limit that the enhanced STA device attempting to access the A-BFT uses, and the second control information represents a back-off value that the enhanced STA device uses when a consecutive number of failed attempts to access the A-BFT exceeds the retry limit specified by the first control information.

* * * * *